(12) United States Patent
Tojo

(10) Patent No.: US 9,126,449 B2
(45) Date of Patent: Sep. 8, 2015

(54) IMAGE FORMING METHOD

(75) Inventor: Kaoru Tojo, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 98 days.

(21) Appl. No.: 13/566,364

(22) Filed: Aug. 3, 2012

(65) Prior Publication Data

US 2013/0050369 A1 Feb. 28, 2013

(30) Foreign Application Priority Data

Aug. 24, 2011 (JP) ................. 2011-183167

(51) Int. Cl.
    *G01D 11/00*     (2006.01)
    *B41J 2/17*     (2006.01)
    *B41M 7/00*     (2006.01)
    (Continued)

(52) U.S. Cl.
    CPC .............. *B41M 7/009* (2013.01); *B41M 7/0081* (2013.01); *C09D 11/101* (2013.01); *C09D 11/322* (2013.01); *C09D 11/40* (2013.01); *C09D 11/54* (2013.01); *B41J 2/2107* (2013.01); *B41M 5/0017* (2013.01); *C09D 11/30* (2013.01); *C09D 11/36* (2013.01)

(58) Field of Classification Search
    CPC .............. B41M 5/5254; B41M 5/5263; B41M 5/5272; B41M 5/5281; B41M 5/5218; B41M 5/0011; B41M 7/00; B41M 7/0027; B41M 5/52; B41M 5/5209; B41M 5/5227; B41M 5/5245; C09D 11/40; C09D 11/30; C09D 11/32; C09D 11/322; C09D 11/324; C09D 11/326; B41J 11/002; B41J 11/0015; B41J 2/2114

USPC ................... 347/102, 105, 100, 95; 101/488; 219/216; 346/25
See application file for complete search history.

(56) References Cited

U.S. PATENT DOCUMENTS 5,439,739 A * 8/1995 Furukawa et al. ......... 428/32.23
5,753,360 A * 5/1998 Jones et al. ................ 428/32.35
(Continued)

FOREIGN PATENT DOCUMENTS

JP     2004-209976 A     7/2004
JP     2008-100511 A     5/2008
(Continued)

OTHER PUBLICATIONS

Notice of Reasons for Rejection, dated May 28, 2013, issued in corresponding JP Application No. 2011-183167, 9 pages in English and Japanese.

(Continued)

*Primary Examiner* — Julian Huffman
*Assistant Examiner* — Leonard S Liang
(74) *Attorney, Agent, or Firm* — Sughrue Mion, PLLC

(57) ABSTRACT

The image forming method of the present invention includes imparting ink to form an image on a recording medium, drying the image, and curing the image after the drying process,
wherein the recording medium has one or a plurality of pigment layers on at least one surface of a support with cellulose pulp as a main component, and a transference amount of pure water into the recording medium is specific value, and
the ink composition includes a pigment, water, and a water soluble polymerizable compound where the content ratio is equal to or more than 15 mass % and less than 40 mass %, and the content of a water soluble organic solvent is less than 3 mass %.

13 Claims, 1 Drawing Sheet

(51) Int. Cl.
*C09D 11/101* (2014.01)
*C09D 11/322* (2014.01)
*C09D 11/40* (2014.01)
*C09D 11/54* (2014.01)
C09D 11/30 (2014.01)
C09D 11/36 (2014.01)
B41J 2/21 (2006.01)
B41M 5/00 (2006.01)

(56) References Cited

U.S. PATENT DOCUMENTS

| | | | | |
|---|---|---|---|---|
| 5,897,961 | A * | 4/1999 | Malhotra et al. | 428/32.22 |
| 6,335,085 | B1 * | 1/2002 | Asano et al. | 428/32.25 |
| 6,338,889 | B1 * | 1/2002 | Shibata et al. | 428/64.4 |
| 7,253,216 | B2 * | 8/2007 | Miyabayashi | 523/205 |
| 7,399,349 | B2 * | 7/2008 | Taguchi et al. | 106/31.43 |
| 8,292,418 | B2 | 10/2012 | Kato et al. | |
| 8,590,999 | B2 * | 11/2013 | Irita et al. | 347/21 |
| 2005/0288384 | A1 * | 12/2005 | Kanke et al. | 522/6 |
| 2006/0194029 | A1 * | 8/2006 | Tsujihata | 428/195.1 |
| 2010/0075052 | A1 * | 3/2010 | Irita | 427/288 |
| 2011/0043578 | A1 | 2/2011 | Tojo | |
| 2011/0050789 | A1 * | 3/2011 | Irita | 347/21 |
| 2011/0050790 | A1 * | 3/2011 | Irita | 347/21 |
| 2011/0069109 | A1 * | 3/2011 | Tojo | 347/21 |
| 2011/0234690 | A1 * | 9/2011 | Ooishi et al. | 347/21 |

FOREIGN PATENT DOCUMENTS

| | | |
|---|---|---|
| JP | 2009132812 A | 6/2009 |
| JP | 2010070693 A | 4/2010 |
| JP | 2011-42150 A | 3/2011 |
| JP | 2011057791 A | 3/2011 |

OTHER PUBLICATIONS

Notice of Reasons for Rejection, dated Dec. 25, 2014, issued in corresponding Chinese Application No. 201210277395.0.

* cited by examiner

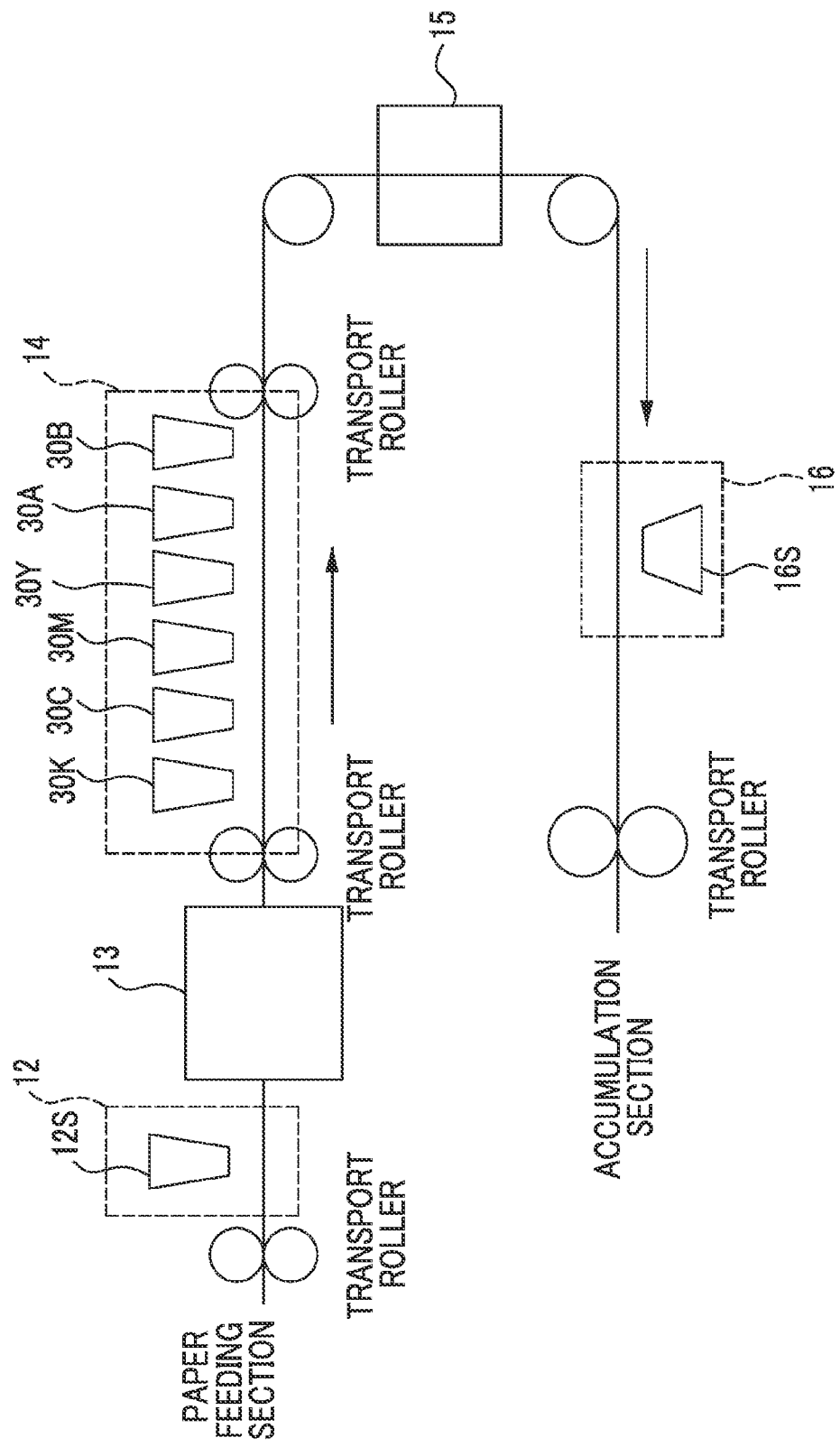

IMAGE FORMING METHOD

BACKGROUND OF THE INVENTION

1. Field of the Invention

The present invention relates to an image forming method which uses an ink jet method.

2. Description of the Related Art

Ink jet techniques are an image recording method where there are expectation for use in the fields such as office printers, home printers and the like and in the commercial field since desired image forming on various recording media is possible.

As ink which is used in ink jet recording, other than solvent based ink, from the point of view of considering the global environment or working environment, a water based ink has gained attention. Out of these, a technique is being examined where a highly scratch resistance image is formed by including a polymerizable monomer component in a water based pigment ink and curing.

As one such image forming technique, for example, an ink jet recording method is disclosed where ultraviolet rays (UV) are irradiated for a predetermined time period after ink is landed on a base material, using an ultraviolet curable ink which contains coloring material, ultraviolet polymerizable material, and a photoinitiator in an aqueous medium (for example, refer to JP2004-209976A).

On the other hand, as the method of including a polymerizable monomer component and curing, there is a technique where the monomer component is thermally polymerized. For example, an ink jet recording method is disclosed where heating is performed after printing using ink on a recording medium where a pigment layer is coated onto a support with cellulose pulp as a main component (for example, refer to JP2008-100511A and JP2011-42150A).

SUMMARY OF THE INVENTION

Among techniques in the related art described above, in a method of ultraviolet ray irradiation for a prescribed time period after ink landing, a film property (scratch resistance, water resistance) and suppression of paper deformation (curl) is increased using exposure before ink is absorbed into paper, but it is difficult to obtain a desired curing sensitivity. That is, with regard to water based ink of a UV curing type, it is understood that appropriate drying is important for obtaining excellent exposure sensitivity, and it is not possible to obtain sufficient exposure sensitivity soon after ink landing as above. Moreover, since it is not possible to obtain sufficient sensitivity, in UV irradiation immediately after ink landing, the setting position of a UV light source and discharge head becomes closer, ink in the vicinity of a discharge hole is cured by light leakage from the UV light source, and as a result, this is a cause of damage to the head. Therefore, risk in terms of the system is extremely high.

In addition, in a thermal curing method, since water derived from the ink or a water soluble organic solvent largely remains in a pigment layer (that is, a coating layer of coated paper) after printing, the strength of the pigment layer is severely decreased, and the layer itself not only weakens, but image adhesion and the strength of the image itself become problems. The reduction in the strength of the pigment layer is alleviated by a remaining amount of the water in the pigment layer or the water soluble organic solvent being reduced due to the passage of time in a recording medium after image formation, and the water or water soluble organic solvent evaporating or dispersing within the pulp. Therefore, after thermal curing, the passage of one day or more is necessary. Accordingly, the carrying out of processing or the like soon after printing is not possible in practice.

In consideration of the above, the present invention has an object of providing an image forming method where an image is formed with superior adhesion to a recording medium and scratch resistance, in a case of image forming on a recording medium where water based ink of a ultraviolet ray curing type is used and permeation of liquid is comparatively slow, and realizes the object.

Specific means for realizing the above problems is as below.

<1> An image forming method including imparting ink to form an image by an ink composition being imparted on a recording medium using an ink jet method, drying the image which is formed on the recording medium, and curing the image by the image after the drying being irradiated with an active energy ray, where the recording medium has one or a plurality of pigment layers on at least one surface of a support with cellulose pulp as a main component, in addition, a transference amount of pure water into the recording medium which is measured by a dynamic scanning absorptometer is equal to or more than 1 ml/m$^2$ and equal to or less than 15 ml/m$^2$ at a contact time of 100 ms and is equal to or more than 2 ml/m$^2$ and equal to or less than 20 ml/m$^2$ at a contact time of 400 ms, and the ink composition includes a pigment, water, and a water soluble polymerizable compound where the content ratio with regard to total mass of the composition is equal to or more than 15 mass % and less than 40 mass %, and the content of a water soluble organic solvent with regard to the total mass of the composition is less than 3 mass %.

<2> The image forming method described in <1> where at least one polymerizable compound is a monomer compound which has an acrylamide structure in the molecule.

<3> The image forming method described in <1> or <2> where the at least one polymerizable compound is a monofunctional acrylamide which has an acrylamide structure in the molecule.

<4> The image forming method described in any one of <1> to <3> where the at least one polymerizable compound is a monofunctional acrylamide which has an acrylamide structure in the molecule, and the content of the monofunctional acrylamide is equal to or more than 10 mass % with regard to the total mass of ink composition.

<5> The image forming method described in any one of <1> to <4> further including imparting a treatment liquid on a recording medium before the imparting of the ink, wherein the treatment liquid includes an aggregation component capable of forming an aggregate body when in contact with the ink composition.

<6> The image forming method described in any one of <1> to <5> further including imparting a treatment liquid on a recording medium before the imparting of the ink, wherein the treatment liquid includes an aggregation component capable of forming an aggregate body when in contact with the ink composition, and the aggregation component includes at least one selected from acid, a polyvalent metal salt and a cationic polymer.

<7> The image forming method described in any one of <1> to <6> where the pigment is a water dispersible pigment where at least a portion of a surface thereof is coated with a polymeric dispersing agent.

<8> The image forming method described in any one of <1> to <7> where the pigment is a water dispersible pigment where at least a portion of a surface thereof is coated with a polymeric dispersing agent which has a carboxyl group.

<9> The image forming method described in any one of <1> to <8> where the recording medium is coated paper, lightweight coated paper, or lightly coated paper.

<10> The image forming method described in any one of <1> to <9> further including imparting a treatment liquid on a recording medium before the imparting of the ink, wherein the treatment liquid includes an aggregation component capable of forming an aggregate body when in contact with the ink composition, and at least one of the ink composition and the treatment liquid further includes a polymerization initiator.

<11> The image forming method described in any one of <1> to <10> where drying starts within 5 seconds from a point in time when droplets of the ink composition land on the recording medium.

<12> The image forming method described in any one of <1> to <11> where an imparted amount of the ink composition in the imparting of the ink is equal to or less than 15 ml/m$^2$.

<13> The image forming method described in any one of <1> to <12> where the drying removes at least a portion of water within the ink composition which forms the image on the recording medium under drying conditions where 60 to 80 mass % of the water content within the ink composition which is imparted on the recording medium with an imparted amount of equal to or less than 15 ml/m$^2$ is removed.

According to the present invention, it is possible to provide an image forming method where an image is formed on a recording medium with superior adhesion, and scratch resistance in a case of image forming on a recording medium where water based ink of a ultraviolet ray curing type is used and permeation of liquid is comparatively slow.

BRIEF DESCRIPTION OF THE DRAWINGS

FIG. 1 is a schematic configuration view illustrating an example of a configuration of an ink jet recording apparatus which uses an embodiment of an image forming method of the present invention.

DESCRIPTION OF THE PREFERRED EMBODIMENTS

Below, an image forming method of the present invention will be described in detail.

The image forming method of the present invention includes a pigment, water, and a water soluble polymerizable compound where the content ratio with regard to total mass of the composition is equal to or more than 15 mass % and less than 40 mass %, and is an ink composition which is configured by being provided with an ink imparting process where an image is formed on a recording medium using an ink jet method, a drying process where the image which is formed on the recording medium is dried, and a curing process where the image is cured and an active energy ray is irradiated with regard to the image after the drying process and where the content of the water soluble organic solvent with regard to the total mass of the composition is less than 3 mass %. At this time, as the recording medium, a recording medium is used which has one or a plurality of pigment layers on at least one surface of a support where cellulose is a main component, and where the transference amount of pure water which is measured by a dynamic scanning absorptometer satisfies a) and b) below.

a) the transference amount is equal to or more than 1 ml/m$^2$ and equal to or less than 15 ml/m$^2$ at a contact time of 100 ms, and b) the transference amount is equal to or more than 2 ml/m$^2$ and equal to or less than 20 ml/m$^2$ at a contact time of 400 ms.

In addition, as required, the image forming method of the present invention may further be configured to be provided with another process such as imparting a treatment liquid, which forms an aggregation component when in contact with the ink composition, on a recording medium before the imparting of the ink.

In the present invention, in the forming of an image on a recording medium which has a pigment layer and where the transference amount of pure water satisfies a) and b) described above and the permeation of water is comparatively slow, the ink composition is dried on the recording medium in advance before UV irradiation with a composition where the ink composition does not actually include a water soluble organic solvent. That is, by carrying out ultraviolet ray (UV) irradiation with regard to the image after drying and not carrying out UV irradiation after the landing of the ink as in the related art, the curing reaction in the image progresses more smoothly compared to in the related art. Furthermore, most of the polymerizable compound in the ink composition remains on the layer surface with the pigment, but since a portion of the polymerizable compound permeates into the pigment layer with the water and the like, the pigment layer is cured with the image during the curing reaction. Due to this, in particular, in a case where a recording medium with a pigment layer is used, not only is it possible to suppress the permeation of water and the water soluble organic solvent into the recording medium but also it is possible to form an image with superior adhesion to the recording medium and scratch resistance compared to in the related art.

For example, in coated paper which has a coating layer as a pigment layer on a support where cellulose pulp is a main component, water and a water soluble organic solvent in the ink permeates into the coating layer when the ink composition has landed while the coating layer suppresses the permeation of water and the like into the cellulose pulp. Due to the delay effect of the permeation of the water and the like due to the coating layer, deforming (for example, curling) of the recording medium is prevented. A polymerizable compound exists in the image on the surface of the coating layer and in the coating layer, and by carrying out UV irradiation after drying as described above, the image is cured with the coating layer and the image which is formed is superior in terms of adhesion and scratch resistance.

Recording Medium

First, the recording medium in the present invention will be described in detail.

In the present invention, as the recording medium where the image is formed, a recording medium is used which has one or a plurality of pigment layers on at least one surface of a support with cellulose pulp as a main component and a transference amount of pure water into the recording medium which is measured by a dynamic scanning absorptometer is equal to or more than 1 ml/m$^2$ and equal to or less than 15 ml/m$^2$ at a contact time of 100 ms and is equal to or more than 2 ml/m$^2$ and equal to or less than 20 ml/m$^2$ at a contact time of 400 ms.

Support

As the support in the present invention with cellulose pulp as a main component, mixing of chemical pulp, mechanical pulp, pulp of recycled waste paper, or the like in an arbitrary ratio is used, and paper is used where a material, where an internal sizing agent, a yield improving agent, a paper strengthening agent, and the like is added as required, is manufactured in a fourdrinier former, a gap type of twin wire former, or a hybrid former where the latter half portion of the fourdrinier portion is configured using a twin wire.

Here, the "main component" is a component which is included at 50 mass % or more with regard to the mass of the support.

The pulp which is used in the support may contain virgin chemical pulp (CP), for example, wood material such as bleached hardwood Kraft pulp, bleached softwood Kraft pulp, unbleached hardwood Kraft pulp, unbleached softwood Kraft pulp, bleached hardwood sulfite pulp, bleached softwood sulfite pulp, unbleached hardwood sulfite pulp, unbleached softwood sulfite pulp, and virgin chemical pulps prepared by chemical processing of other fibrous materials, and virgin mechanical pulp (MP), for example, wood material such as ground pulp, chemiground pulp, chemimechanical pulp, semichemical pulp and virgin mechanical pulps prepared by mainly mechanical processing of other fibrous materials. In addition, pulp from waste paper may be used, and the materials for pulp from waste paper are listed in standard specifications of waste paper quality from the Paper Recycling Promotion Center and examples thereof include white superior paper, white ruled paper, cream-white paper, card, extra white paper, medium white paper, simili paper, fair complexion paper, Kent paper, white art paper, superior cut paper, other cut paper, newspaper, magazine paper and the like. More specifically, examples include chemical pulp paper and paper containing high yield pulp and the like as used paper made from paper and cardboard such as printer paper such as uncoated computer paper, thermal-sensitive paper, and pressure-sensitive paper which are information related paper; used office waste paper such as PPC paper; coated paper such as art paper, coated paper, lightly coated paper, matted paper; uncoated paper such as bond paper, color bond paper, note-book paper, letter paper, wrapping paper, fancy paper, medium quality paper, newspaper, woody paper, supermarket wrapping paper, simili paper, stark white roll paper, and milk carton paper. The used paper may be used independently or in combination of two or more.

In the support, it is possible to use a filler or an internal sizing agent. It is possible to reference the description in the paragraphs [0025] to [0027] in JP2011-42150A for the details of fillers and internal sizing agents.

Pigment Layer

The recording medium of the present invention has one or a plurality of pigment layers on at least one of the surfaces of the support.

As the pigment which is used in the pigment layer, the type thereof is not particularly limited and it is possible to use a known organic pigment or inorganic pigment in the related art and it is possible to use one type or mix two or more types of the pigments.

For example, examples include a white inorganic pigment such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, aluminum oxide (alumina), lithopone, zeolite, hydrated halloysite, magnesium carbonate, or magnesium hydroxide or an organic pigment such as a styrene-containing plastic pigment, an acrylic plastic pigment, polyethylene, microcapsules, urea resin, or melamine resin. From the point of view of improving the concentration of the printed image by maintaining the transparency of the recording medium, a white inorganic pigment is preferable.

It is possible for the pigment layer to further contain additives such as an aqueous binder, an anti-oxidant, a surfactant, a defoaming agent, a foam preventing agent, a pH adjusting agent, a curing agent, a colorant, a fluorescent whitening agent, a preservative, and a waterproofing agent.

Examples of the aqueous binder include a water soluble polymer such as a styrene/maleate copolymer, a styrene/acrylate copolymer, a polyvinyl alcohol, a silanol-modified polyvinyl alcohol, starch, cationized starch, casein, gelatin, carboxymethylcellulose, hydroxyethyl cellulose, or polyvinyl pyrrolidone and a water dispersible polymer such as styrene butadiene latex or acrylic emulsion.

It is possible to arbitrarily select a method for forming the pigment layer on the support according to the object thereof without being particularly limited. For example, it is possible to form the pigment layer by coating and drying a dispersion solution where the pigment is dispersed in water on the support.

In the present invention, the amount of the pigment in the pigment layer is preferably 0.1 $g/m^2$ to 20 $g/m^2$ and more preferably in the range of 0.5 $g/m^2$ to 10 $g/m^2$. When the amount of the pigment is 0.1 $g/m^2$ or more, blocking resistance is excellent and when the amount of the pigment is 20 $g/m^2$ or less, it is advantageous in terms of brittleness. The pigment which is included in the pigment layer is preferably contained at 10 mass % or more with regard to the total solid content of the layer, more preferably contained at 14 mass % or more, and even more preferably contained at 18 mass % or more.

Physical Properties of Recording Medium

The recording medium in the present invention has the characteristics of the transference amount of pure water into the recording medium which has been measured by a dynamic scanning absorptometer being equal to or more than 1 $ml/m^2$ and equal to or less than 15 $ml/m^2$ at a contact time of 100 ms and being equal to or more than 2 $ml/m^2$ and equal to or less than 20 $ml/m^2$ at a contact time of 400 ms.

The image forming method of the present invention is able to obtain a recorded image with high resolution which is superior in terms of water resistance and abrasion resistance using the recording medium with a comparatively lower amount of ink absorption in the range of the transference amount. In other words, according to the image forming method of the present invention, it is possible to obtain a recorded image with high resolution which is superior in terms of water resistance and abrasion resistance using an ink jet method without using a recording medium exhibiting a transference amount which exceeds the range of the transference amount which is able to absorb a large amount of ink (for example, specialized ink jet paper or the like).

Here, 1 $ml/m^2$ or more at a contact time of 100 ms and 2 $ml/m^2$ or more at a contact time of 400 ms with relation to the transference amount indicate that the recording medium has the pigment layer which is able to absorb ink. In addition, 15 $ml/m^2$ or less at a contact time of 100 ms and 20 $ml/m^2$ or less at a contact time of 400 ms indicate that the ink absorption amount is comparatively small.

That is, that "the transference amount of pure water into the recording medium which has been measured by a dynamic scanning absorptometer" being in the range described above has the meaning that the amount of permeation of the ink is small due to the recording medium having the pigment layer.

Here, the dynamic scanning absorptometer (DSA, Japan TAPPI Journal, Vol. 48, May 1994, p. 88-92, Shigenori Kuga) is an apparatus which is able to accurately measure liquid absorption in an extremely short period of time. The dynamic scanning absorptometer performs measurements automatically using a method including reading the rate of liquid absorption directly from the movement of the meniscus in a capillary tube, using a sample in the shape of a disk, scanning the liquid absorption head thereon in the shape of a spiral, automatically changing the scanning speed according to a pattern which is set in advance, and measuring only the required number of points with a single sample. The liquid supply head for supplying a liquid to a paper sample is connected to a capillary tube via a Teflon (registered trademark) tube and the position of the meniscus within the capillary tube is read automatically with an optical sensor. More specifically, the amount of transference of pure water or ink is measured using a dynamic scanning absorptometer (Model K350 Series D, Kyowa Seiko Co., Ltd.). It is possible to determine the transference amount at contact times of 100 ms and 400 ms by interpolating from a measured value of transference amount at a contact time approximating each contact time. The measurement is carried out at 23° C. and 50% RH.

In the recording medium of the present invention, the amount of transference of pure water to the recording medium at a contact time of 100 ms which is measured using a dynamic scanning absorptometer is 1 ml/m$^2$ to 15 ml/m$^2$, is preferably 1 ml/m$^2$ to 10 ml/m$^2$, and is more preferably 1 ml/m$^2$ to 8 ml/m$^2$. When the amount of transference of pure water at a contact time of 100 ms is too small, it is easy for beading to occur. In addition, when the transference amount exceeds 15 ml/m$^2$ and is too large, the diameter of the ink dots after recording is smaller than the desired diameter.

Here, beading is a phenomenon where variation in concentration is possible due to the colorant in the ink forming lumps in places due to a certain ink droplet being hit onto the recording medium and remaining on the surface of the recording medium in a liquid state without having been completely absorbed into the inner portion of the recording medium until the next ink droplet is hit onto the recording medium and by the mixing of the ink droplet which is hit afterwards during ink jet recording.

In the recording medium of the present invention, the amount of transference of pure water to the recording medium at a contact time of 400 ms which is measured using a dynamic scanning absorptometer is 2 ml/m$^2$ to 20 ml/m$^2$, is preferably 2 ml/m$^2$ to 15 ml/m$^2$, and is more preferably 2 ml/m$^2$ to 10 ml/m$^2$. When the amount of transference of pure water at a contact time of 400 ms is too small, it is easy for a trace of a spur to occur since drying is insufficient. In addition, when the transference amount exceeds 20 ml/m$^2$ and is too large, it is easy for bleeding to occur and it is easy for the glossiness of the image portion after drying to be reduced.

The pigment layer of the recording medium of the present invention is configured to have the pigment and a resin binder as the main components. It is possible to adjust in a direction to reduce the transference amount by making the amount of the resin rich and in a direction to increase the transference amount by making the amount of the pigment rich. In addition, it is possible to increase the transference amount even by increasing the specific surface area of the pigment particles which configure the pigment layer, for example, reducing the particle diameter and using a type of pigment with a large specific surface area.

As the recording medium of the present invention, for example, it is possible to use so-called coated paper which is used in typical offset printing. The coated paper is provided with a coating layer by coating a coating material on a surface of bond paper or medium quality paper which has not typically been surface treated with cellulose as a main component. In the image forming using normal aqueous ink jetting which typically uses coated paper as the recording medium, it is easy for problems to occur in terms of product quality such as bleeding of the image or abrasion resistance, but in the image forming method of the present invention, the generation of variation in concentration is prevented with uniform quality by suppressing image bleeding and it is possible to record an image with high image resolution and excellent abrasion resistance.

According to the image forming method of the present invention, it is possible to appropriately use coated paper, lightweight coated paper, or lightly coated paper and it is possible to effectively form a high quality image on these recording media.

It is possible to use the coated paper by acquiring coated paper which is typically on the market. For example, it is possible to use typical coated paper for printing, and specifically, examples of A2 gloss paper can include "OK Top Coat+" (manufactured by Oji Paper Co., Ltd.), "Aurora Coat" (manufactured by Nippon Paper Industries Co., Ltd.), "Pearl Coat" (manufactured by Mitsubishi Paper Mills Limited), "S Utoriro Coat" (manufactured by Daio Paper Corporation), "Mu Coat Neos" (manufactured by Hokuetsu Paper Mills, Ltd.), and "Raicho Coat" (manufactured by Chuetsu Pulp & Paper Co., Ltd.), examples of A2 mat paper can include "New Age" (manufactured by Oji Paper Co., Ltd.), "OK TOP Coat Mat" (manufactured by Oji Paper Co., Ltd.), "U-Lite" (manufactured by Nippon Paper Industries Co., Ltd.), "New V Mat" (manufactured by Mitsubishi Paper Mills Limited), and "Raicho Mat Coat N" (manufactured by Chuetsu Pulp & Paper Co., Ltd.), examples of A1 gloss art paper can include "OK Kanefuji+" (manufactured by Oji Paper Co., Ltd.), "Tokumitsu Art" (manufactured by Mitsubishi Paper Mills Limited), and "Raicho Toku Art" (manufactured by Chuetsu Pulp & Paper Co., Ltd.), examples of A1 dull art paper can include "Satin Kanefuji+" (manufactured by Oji Paper Co., Ltd.), "Super Mat Art" (manufactured by Mitsubishi Paper Mills Limited), and "Raicho Dull Art" (manufactured by Chuetsu Pulp & Paper Co., Ltd.), and examples of A0 art paper can include "SA Kanefuji+" (manufactured by Oji Paper Co., Ltd.), "Superior Art" (manufactured by Mitsubishi Paper Mills Limited), "Raicho Super Art N" (manufactured by Chuetsu Pulp & Paper Co., Ltd.), "Ultra Satin Kanefuji+" (manufactured by Oji Paper Co., Ltd.), and "Diamond Premium Dull Art" (manufactured by Mitsubishi Paper Mills Limited).

Ink Imparting Process

In the ink imparting process of the present invention, an image is formed by imparting the ink composition, which includes the pigment, water, and the water soluble polymerizable compound where the content ratio with regard to total mass of the composition is equal to or more than 15 mass % and less than 40 mass %, and where the content of the water soluble organic solvent with regard to the total mass of the composition is less than 3 mass %, on the recording medium using an ink jet method.

The image recording using the ink jet method discharges the ink composition on the recording medium by the supplying of energy and forms a colored image. Here, as the ink jet method which is preferable in the present invention, it is possible to appropriately use a method disclosed in paragraph [0093] to [0105] of JP2003-306623A.

The ink jet method is not particularly limited and may be a known method, for example, any of a charge control method where ink is discharged using static induction, a drop on demand method (pressure pulse method) which uses vibration pressure of a piezo element, an acoustic ink jet method where ink is discharged using radiation pressure by changing an electric signal into an acoustic beam and irradiating the ink, a thermal ink jet method where bubbles are formed by heating the ink and pressure which is generated is used, or the like. As the ink jet method, in particular, in a method which is disclosed in JP1979-59936A (JP-S54-59936A), it is possible to effectively use an ink jet method where a rapid change in volume is generated in the ink which receives the action of heat energy and ink is discharged from a nozzle using the action force due to the change in states.

Here, in the ink jet method, a method where there are a plurality of ejections of ink with a low concentration referred to as photo ink with a small volume, a method where image quality is improved using a plurality of inks with different concentrations with the same color phase in practice, and a method, where a colorless and transparent ink is used, are included.

In addition, in the ink imparting process, image forming is possible by, for example, changing the transport speed of the recording medium. The transport speed is not particularly limited if within the range where image quality does not deteriorate and it is preferably 100 to 3000 mm/s, is more preferably 150 to 2700 mm/s, and is even more preferably 250 to 2500 mm/s.

In the present invention, it is preferable that the maximum imparting amount of the ink composition to the recording medium be 15 ml/m$^2$ or less. By the maximum imparting amount being 15 ml/m$^2$ or less, adhesion of the image is more superior. Furthermore, as the maximum imparting amount, 8 to 15 ml/m$^2$ is preferable, 8 to 12 ml/m$^2$ is more preferable, and 8 to 11 ml/m$^2$ is particularly preferable from the point of view of adhesion and concentration of the image. It is possible for the maximum imparting amount to be controlled by adjusting the discharge method from the discharge nozzles.

Ink Composition

The ink composition of the present invention is a water based ink composition which includes water as a medium, includes at least one type of pigment which is a colorant, water, and at least one type of water soluble polymerizable compound where the content ratio with regard to total mass of the composition is equal to or more than 15 mass % and less than 40 mass %, and is configured so that the content of the water soluble organic solvent with regard to the total mass of the composition is less than 3 mass %. The ink composition may be configured to further use at least one type of resin particles, at least one type of water soluble organic solvent, and other components such as a surfactant or a lubricating agent as required.

The ink composition is used as an ink for ink jet recording and is able to be used in the recording of color images. For example, in a case where a full color image is formed, the ink composition is preferably used as a magenta color ink, a cyan color ink, and a yellow color ink, and in addition, a black color ink may be further used to adjust the colors. In addition, other than yellow, magenta, and cyan color inks, the ink composition is possible to be used red, green, blue, and white inks and so-called specialized color inks in the printing field.

Pigment

The ink composition of the present invention contains at least one type of pigment. As the pigment, there is not particular limitation and it is possible to arbitrarily select according to the object thereof, and for example, an organic pigment or an inorganic pigment may be used. It is preferable from the point of ink adhesion that the pigment be a pigment which is hardly soluble or difficult to be soluble in water.

Examples of the organic pigment include an azo pigment, a polycyclic pigment, a dye chelate, a nitro pigment, a nitroso pigment, aniline black, and the like. Among these, an azo pigment, a polycyclic pigment, and the like are more preferable.

Examples of the inorganic pigment include titanium oxide, iron oxide, calcium carbonate, barium sulfate, aluminum hydroxide, barium yellow, cadmium red, chromium yellow, carbon black, and the like. Among them, carbon black is particularly preferable.

In the case where an organic pigment is used, in regard to the average particle diameter of the organic pigment, smaller is good from the point of view of transparency and color reproduction and larger is preferable from the point of view of resistance to light. From the point of view of achieving both of these, an average particle diameter of 10 to 200 nm is preferable, 10 to 150 nm is more preferable, and 10 to 120 nm is even more preferable. In addition, in relation to the particle distribution of the organic pigment, there is no particular limitation and any of a pigment with a wide particle distribution or a pigment with a simple particle distribution is sufficient. In addition, an organic pigment which has a simple particle distribution may be used by two or more types being mixed.

Dispersing Agent

It is possible for the ink composition of the present invention to contain at least one type of dispersing agent. As the dispersing agent of the pigment described above, any of a polymer dispersing agent or a surfactant type dispersing agent with a low molecular weight is sufficient. In addition, as the polymer dispersing agent, any of a water soluble dispersing agent or a water insoluble dispersing agent is sufficient.

The surfactant type dispersing agent with a low molecular weight is able to stably disperse the pigment in the water medium while the ink maintains low viscosity. The surfactant type dispersing agent with a low molecular weight is a low molecular weight dispersing agent with a molecular weight of 2,000 or less. In addition, the molecular weight of the surfactant type dispersing agent with a low molecular weight is preferably 100 to 2,000 and is more preferably 200 to 2,000.

The surfactant type dispersing agent with a low molecular weight has a configuration which includes a hydrophilic group and a hydrophobic group. In addition, it is sufficient if one or more of the hydrophilic group and the hydrophobic group are each independently included in one molecule, and in addition, there may be a plurality of types of the hydrophilic group and the hydrophobic group. In addition, it is possible to appropriately have a linking group for linking with the hydrophilic group and the hydrophobic group.

The hydrophilic group is anionic, cationic, nonionic, a betaine type which is a combination of these or the like. It is sufficient if the anionic group has a negative charge, and a phosphate group, a phosphonate group, a phosphinate group, a sulfate group, a sulfonate group, a sulfinate group and a carboxylic acid group are preferable, a phosphate group and a carboxylic acid group are more preferable, and a carboxylic acid group is even more preferable. It is sufficient if the cationic group has a positive charge, an organic cationic substituent is preferable and a nitrogen or phosphorous cationic group is more preferable. In addition, a pyridinium cation or an ammonium cation is even more preferable. Examples of the nonionic group include polyethylene oxide; polyglycerol, a portion of a sugar unit, and the like.

The hydrophilic group is preferably an anionic group. The anionic group is preferably a phosphate group, a phosphonate group, a phosphinate group, a sulfate group, a sulfonate group, a sulfinate group and a carboxylic acid group, a phosphate group and a carboxylic acid group are more preferable, and a carboxylic acid group is even more preferable.

In addition, in a case where the surfactant type dispersing agent with a low molecular weight has an anionic hydrophilic group, 3 or more pKa are preferable from the point of view of promoting an aggregation reaction by coming into contact with an acidic treatment liquid. The pKa of the surfactant type dispersing agent with a low molecular weight is a value which is determined experimentally using a titration curve by adding dropwise a liquid, where 1 mmol/L of the surfactant type dispersing agent with a low molecular weight is dissolved in a solvent of tetrahydrofuran and water (3:2=V/V), to an acid or an alkali aqueous solution. When the pKa of the surfactant type dispersing agent with a low molecular weight is 3 or more, 50% or more of the anionic group is in a non-dissociated state when approaching a liquid with a pH of 3 in theory. Accordingly, the water solubility of the surfactant type dispersing agent with a low molecular weight is remarkably reduced and an aggregation reaction occurs. That is, the aggregation reactivity is improved. Also from this point of view, the surfactant type dispersing agent with a low molecular weight is preferably a case of having a carboxylic acid group as the anionic group.

The hydrophobic group has a structure such as hydrocarbon-based, fluorocarbon-based or silicone-based, and in particular, a hydrocarbon-based group is preferable. In addition, the hydrophobic group may be any of a straight-chain structure or a branched structure. In addition, the hydrophobic group may be a single chain structure or a structure with a plurality of chains, and in the case of a structure with 2 or more chains, there may be a plurality of types of hydrophobic groups.

In addition, the hydrophobic group preferably is a hydrocarbon group with 2 to 24 carbon atoms, is more preferably a hydrocarbon group with 4 to 24 carbon atoms, and is even more preferably a hydrocarbon group with 6 to 20 carbon atoms.

Out of the polymer dispersing agents, examples of the water soluble dispersing agent include a hydrophilic polymer compound. For example, examples of a natural hydrophilic polymer compound include plant polymers such as gum arabia, tragacanth gum, guar gum, karaya gum, locust bean gum, arabinogalactan, pectin and quince seed starch, sea weed polymers such as alginic acid, carrageenan and agar; animal polymers such as gelatin, casein, albumin and collagen and microbial polymers such as xanthan gum and dextran.

Examples of hydrophilic polymer compounds where natural products as a material have been modified include cellulose polymers such as methylcellulose, ethylcellulose, hydroxyethylcellulose, hydroxypropylcellulose and carboxymethylcellulose, starch polymers such as sodium starch glycolate and sodium starch phosphate ester, and sea weed polymers such as sodium alginate and alginate propylene glycol ester.

Furthermore, examples of synthetic hydrophilic polymer compounds include vinyl polymers such as polyvinyl alcohol, polyvinyl pyrrolidone, and polyvinyl methyl ether, acrylic resins such as non-crosslinked polyacrylamide, polyacrylic acid or alkali metal salts thereof and water-soluble styrene-acryl resins, polymer compounds having the salt of the cationic functional group in the side chain, such as water-soluble styrene-maleic acid resins, water-soluble vinyl naphthalene-acryl resins, water-soluble vinyl naphthalene maleic acid resins, polyvinyl pyrrolidone, polyvinyl alcohol, alkali metal salts of β-naphthalene sulfonate formalin condensate and quaternary ammonium and amino group, and natural polymer compounds such as shellac.

Out of these, a water soluble dispersing agent, where a carboxyl group is introduced such as a copolymer with a homopolymer of acrylic acid, methacrylic acid, or styrene acrylic acid or a copolymer with a monomer having another hydrophilic group, is preferable as the hydrophilic polymer compound.

Out of the polymer dispersing agents, it is possible to use a polymer having both a hydrophilic group and a hydrophobic group as the water insoluble dispersing agent. Examples thereof include a copolymer of styrene-(meth)acrylic acid, a copolymer of styrene-(meth)acrylate-(meth)acrylic acid ester, a copolymer of (meth)acrylic acid ester-(meth)acrylic acid, a copolymer of polyethylene glycol(meth)acrylate-(meth)acrylic acid, a copolymer of vinyl acetate-maleic acid, and a copolymer of styrene-maleic acid.

The weight average molecular weight of the polymer dispersing agent is preferably 3,000 to 100,000, is more preferably 5,000 to 50,000, is even more preferably 5,000 to 40,000, and is particularly preferably 10,000 to 40,000.

From the point of view of self-dispersing and speed of aggregation when in contact with the treatment liquid, the polymer dispersing agent preferably includes a polymer which has a carboxyl group, a polymer which has a carboxyl group and where the acid value is 100 mg KOH/g or less is preferable, and a polymer where the acid value is 25 to 100 mg KOH/g is more preferable. In particular, in a case of being used with the treatment liquid, which aggregates a component in the ink composition, in the ink composition of the present invention, a polymer dispersing agent which has a carboxyl group and where the acid value is 25 to 100 mg KOH/g is effective. The treatment liquid will be described later.

As the mixing mass ratio (p:s) of the pigment (p) and the dispersing agent (s), the range of 1:0.06 to 1:3 is preferable, the range of 1:0.125 to 1:2 is more preferable, and the range of 1:0.125 to 1:1.5 is even more preferable.

A dye may be used instead of the pigment. In a case where a dye is used, it is possible to use a dye which is held in a water insoluble carrier. As the dye, it is possible to use a known dye without any limitations, and for example, a dye disclosed in JP2001-115066A, JP2001-335714A, JP2002-249677A, and the like is appropriately used. As the carrier, there is no particular limitation if insoluble or difficult to dissolve in water and it is possible to select and use from an inorganic material, an organic material or a composite material thereof. Specifically, a carrier disclosed in JP2001-181549A, JP2007-169418A, and the like is appropriately used.

It is possible to use the carrier which holds the dye (water insoluble colorant particles) as an aqueous dispersant by using a dispersing agent. As the dispersing agent, it is possible to appropriately use the dispersing agents described above.

In the present invention, from the point of view of resistance to light, product quality, and the like of the image, the inclusion of the pigment and the dispersing agent is preferable and the inclusion of the organic pigment and the polymer dispersing agent and at least a portion of the surface of the pigment being contained as the water dispersible pigment coated by the polymer dispersing agent is more preferable. Furthermore, the ink composition particularly preferable includes the organic pigment and the polymer dispersing agent, which contains a carboxyl group, and contains the water dispersible pigment where at least a portion of the surface thereof is coated by the polymer dispersing agent which contains a carboxyl group, and from the point of view of aggregation, the pigment preferably is water insoluble by being coated by the polymer dispersing agent which contains a carboxyl group.

As the average particle diameter of the pigment in a dispersed state, 10 to 200 nm is preferable, 10 to 150 nm is more preferable, and 10 to 100 nm is even more preferable. When the average particle diameter is 200 nm or less, color reproduction is excellent and ejection characteristics when ejecting using an ink jet method are excellent. When the average particle diameter is 10 nm or more, resistance to light is excellent. In addition, in relation to the particle diameter distribution of the colorant, there is no particular limitation and any of a wide particle diameter distribution or a simple particle diameter distribution is sufficient. In addition, two or more types of a colorant with a simple distribution may be mixed and used.

Here, the average particle diameter of the pigment in a dispersed state indicates an average particle diameter in an ink state but it is the same with regard to a so-called condensed ink dispersant in a stage previous to being made into ink.

Here, the average particle diameter of the pigment in a dispersed state and the average particle diameter and particle diameter distribution of the polymer particles are determined by measuring the volumetric average particle diameter with a dynamic light scattering method using a particle size distribution measuring instrument NANOTRAC UPA-EX150 (manufactured by NIKKISO Co., Ltd.).

The pigment may be used as one type singly or two or more types combined.

As the content of the pigment in the ink composition, 1 to 25 mass % is preferable and 2 to 15 mass % is more preferable with regard to the ink composition from the point of view of image density.

Polymerizable Compound

The ink composition of the present invention contains at least one type of water soluble polymerizable compound which has a polymerizable group and is polymerizable due to irradiation by an active energy ray. The polymerizable compound is used in combination with the pigment and the resin particles and strengthens the image by being taken in between the particles when there is aggregation by coming into contact with the treatment liquid and there being polymer curing after this.

Water solubility is being able to be dissolved in water to be equal or more than a certain concentration and it is sufficient if able to be dissolved in an aqueous ink or in the treatment liquid (preferably uniformly). In addition, it is sufficient if dissolved in an ink (preferably uniformly) by the dissolution being increased by adding the water soluble organic solvent which will be described later or another polymerizable compound. Specifically, dissolution with regard to water (25° C.) of 10 mass % or more is preferable and 15 mass % or more is more preferable.

As the polymerizable compound, a nonionic or cationic polymerizable compound is preferable from the point of view of not preventing a reaction with the aggregation component, the pigment and the resin particles and a polymerizable compound where dissolution with regard to water of 10 mass % or more (further, 15 mass % or more) is preferable.

In the present invention, the content of the polymerizable compound in the ink composition is 15 mass % or more and less than 40 mass % with regard to the total mass of the ink composition. When the content of the polymerizable compound is less than 15 mass %, the adhesion with the recording medium is inferior and the scratch resistance of the image deteriorates due to a reduction in the image strength. When the content of the polymerizable compound is 40 mass % or more, steps (pile height) in the image are remarkable, scratch resistance is inferior, and glossiness is reduced.

Out of these, the content of the polymerizable compound is preferably in the range of 20 mass % or more and 35 mass % or less.

It is possible for the polymerizable compound to be contained as one type singly or two or more types in combination.

Examples of nonionic polymerizable monomer include a polymerizable compound such as a (meth)acrylic monomer.

Examples of the (meth)acrylic monomer include ultraviolet ray curing type monomers and oligomers such as (meth)acrylic ester of a multivalent alcohol, a (meth)acrylic ester of a glycidyl ether of a multivalent alcohol, a (meth)acrylic ester of a polyethylene glycol, a (meth)acrylic ester of an ethylene oxide adduct of a multivalent alcohol, or a reactant of a hydroxyl group-containing (meth)acrylic ester with a polybasic acid anhydride.

The multivalent alcohol is a multivalent alcohol in which a chain is extended using an ethylene oxide chain in an inner portion due to the addition of an ethylene oxide.

Below, specific examples of a nonionic polymerizable compound (nonionic compounds 1 to 6) are shown. Here, the present invention is not limited thereto.

[Chem. 1]

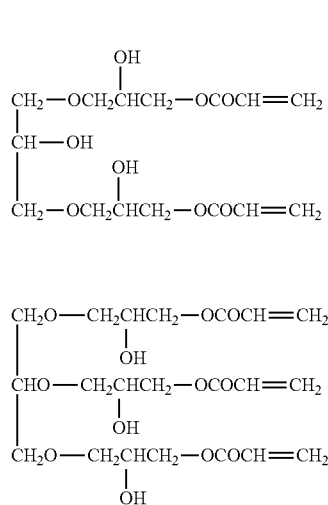
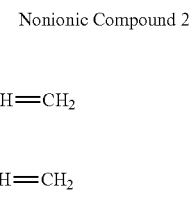

Nonionic Compound 4

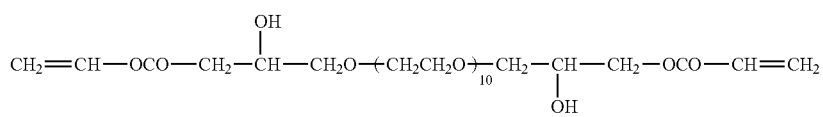

Nonionic Compound 5

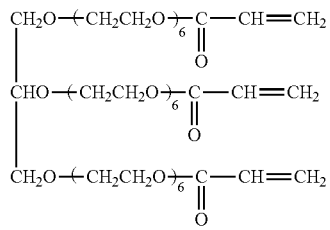

Nonionic Compound 6

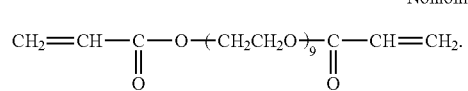

In addition, it is possible to use an acrylic ester which has 2 or more acryloyl groups in one molecule which is derived from a multi-hydroxyl group compound. Examples of the multi-hydroxyl compound include a condensed glycol, an oligoether, an oligoester, or the like.

Furthermore, the nonionic polymerizable compound is appropriately a polyol(meth)acrylic ester having two or more hydroxyl groups such as a monosaccharide or a disaccharide or a (meth)acrylic ester with triethanolamine, diethanolamine, trishydroxymethyl aminomethane, and trishydroxymethyl aminoethane.

In addition, as the nonionic polymerizable compound, a water soluble polymerizable compound (or preferably a monomer compound) which has an acrylamide structure in the molecule may be appropriately used. The polymerizable compound which has an acrylamide structure in the molecule is preferably a compound represented by the general formula (1).

[Chem. 2]

General Formula (1)

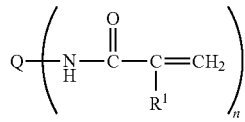

In the general formula (1), Q represents a n-valent group and $R^1$ represents a hydrogen atom or a methyl group. In addition, n represents an integer of 1 or more.

The compound represented by the general formula (1) is where an unsaturated vinyl monomer binds to the group Q using an amide binding. $R^1$ represents a hydrogen atom or a methyl group and is preferably a hydrogen atom. The valency n of the group Q is 1 or more from the point of view of improving permeability, polymerizing efficiency, and discharge stability, and out of this range, 1 or more and 6 or less is preferable and 1 or more and 4 or less is more preferable. In the present invention, from the point of view of it being advantageous in permeability into the coating layer of the recording medium, the inclusion of a monofunctional acrylamide where n=1 is preferable, and furthermore, the inclusion of the monofunctional acrylamide with 10 mass % with regard to the total mass of the ink composition is more preferable. In addition, it is preferable to use a monofunctional (meth)acrylamide with superior permeation where n=1 and a multi-functional (meth)acrylamide with superior polymerizing efficiency where n is two or more in combination.

In addition, the group Q is not particularly limited as long as it is a group which is able to bind with a (meth)acrylamide structure and it is preferable if the compound represented by the general formula (1) is selected from a group where the water solubility described above is satisfied. Specifically, from the compounds which are selected from the compound group X below, examples can include a residue where 1 or more hydrogen atoms or a hydroxyl group is removed.

Compound Group X

A polyol such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentane diol, 2-methyl-2,4-pentane diol, 1,5-hexanediol, 1,6-hexanediol, 2,5-hexanediol, glycerin, 1,2,4-butanetriol, 1,2,6-hexanetriol, 1,2,5-pentanetriol, thio glycol, trimethylolpropane, ditrimethylolpropane, trimethylolethane, ditrimethylolethane, neopentyl glycol, pentaerythritol, dipentaerythritol, and a condensate thereof, a low-molecular-weight polyvinyl alcohol, and a sugar.

A polyamine such as ethylenediamine, diethylenetriamine, triethylenetetramine, polyethylene imine, and polypropylene diamine.

Furthermore, examples can include a substituted or unsubstituted alkylene chain with 4 or less carbon atoms such as a methylene, an ethylene, a propylene, or a butylene group, or furthermore, a functional group having a saturated or unsaturated hetero ring such as a pyridine ring, an imidazole ring, a pyrazine ring, a piperidine ring, a piperazine ring, and a morpholine ring.

As the group Q described above, out of these, a residue of a polyol which contains an oxyalkylene group (preferably an oxyethylene group) is preferable and a residue of a polyol which contains 3 or more oxyalkylene groups (preferably an oxyethylene group) is particularly preferable.

Below, specific examples of the water soluble polymerizable compounds having an acrylamide structure in the molecule are shown. Here, the present invention is not limited thereto.

[Chem. 3]
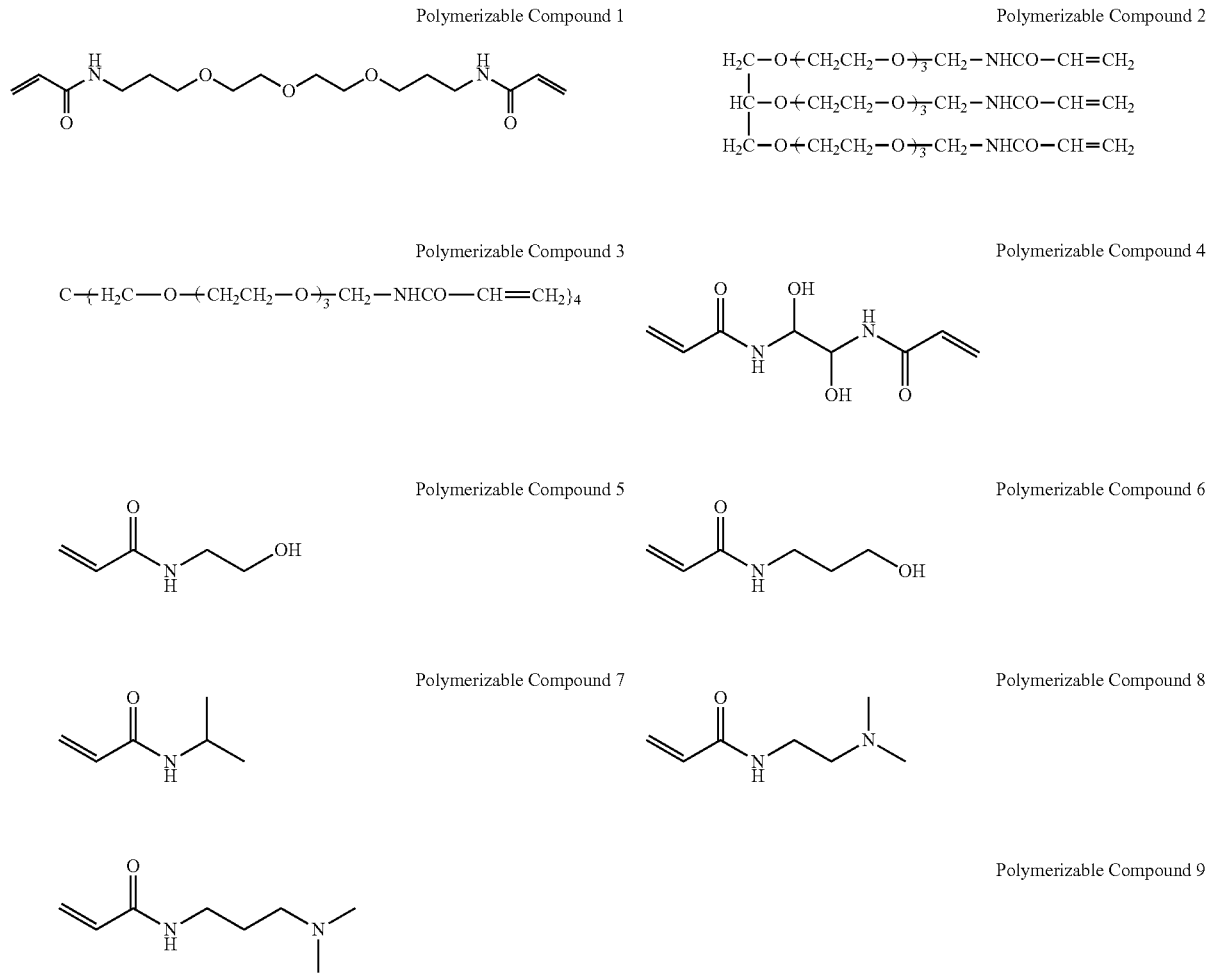
[Chem. 4]
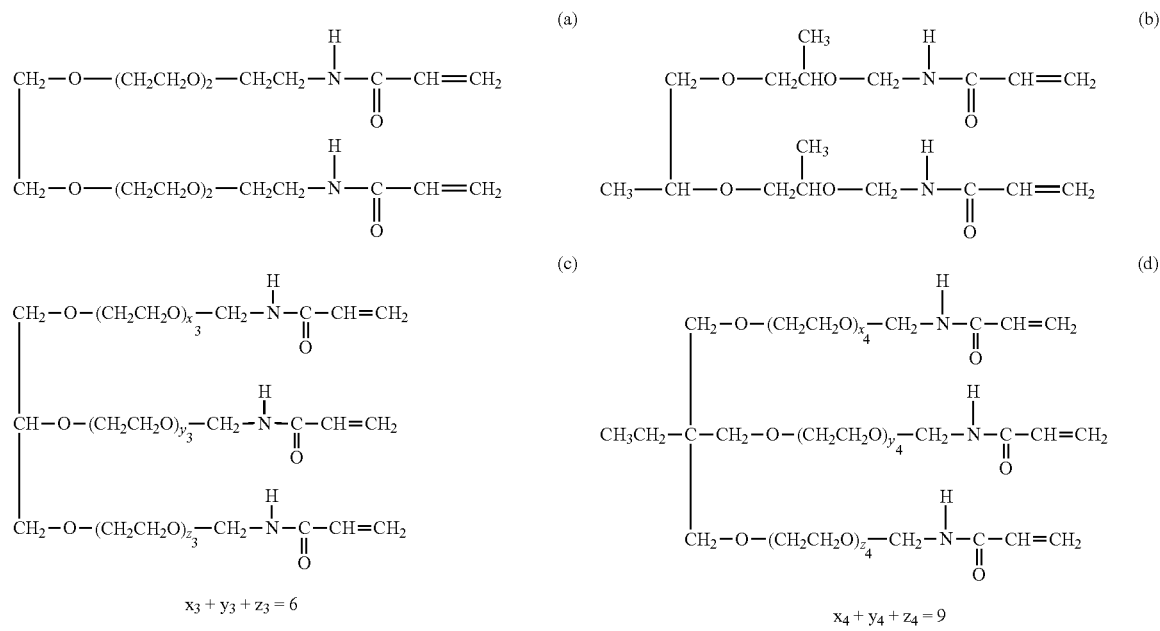

-continued
[Chem. 5]
(e)
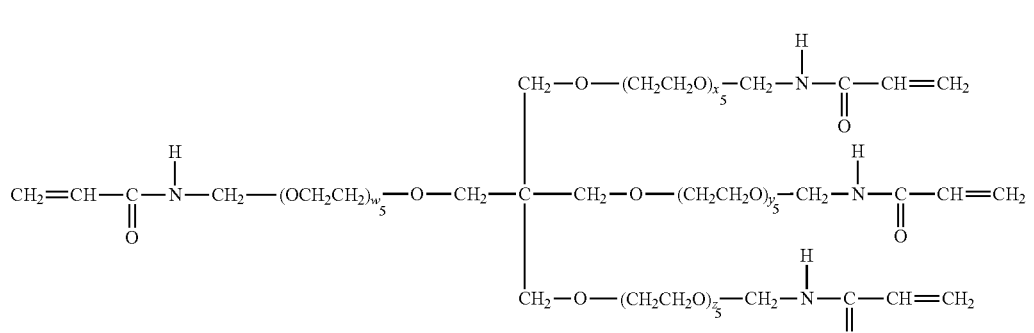
$w_5 + x_5 + y_5 + z_5 = 6$
(f)
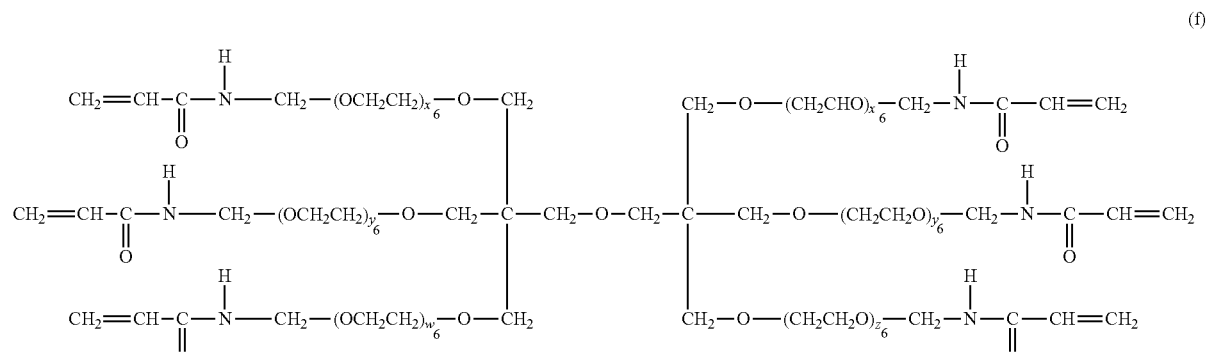
$t_6 + u_6 + w_6 + x_6 + y_6 + z_6 = 12$
(g)
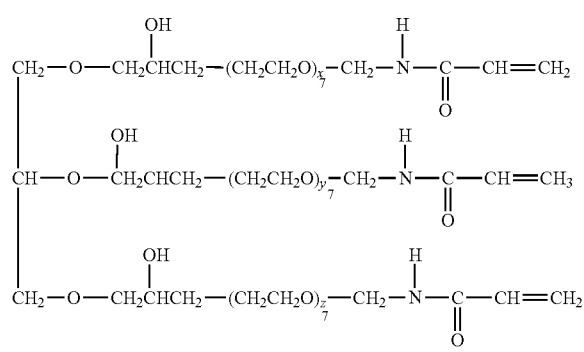
$x_7 + y_7 + z_7 = 3$
[Chem. 6]
(h)
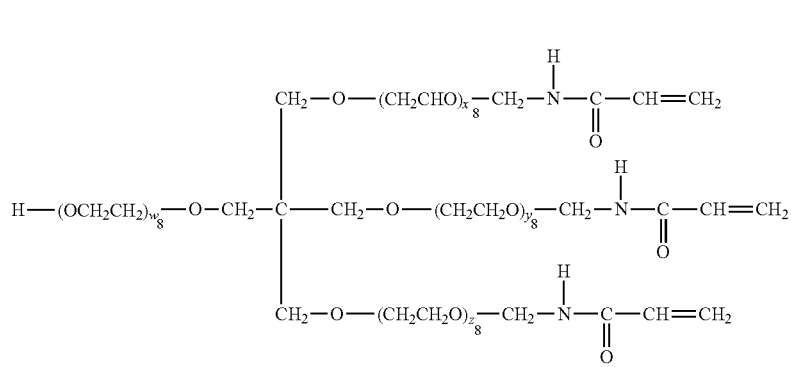
$w_8 + x_8 + y_8 + z_8 = 6$ -continued

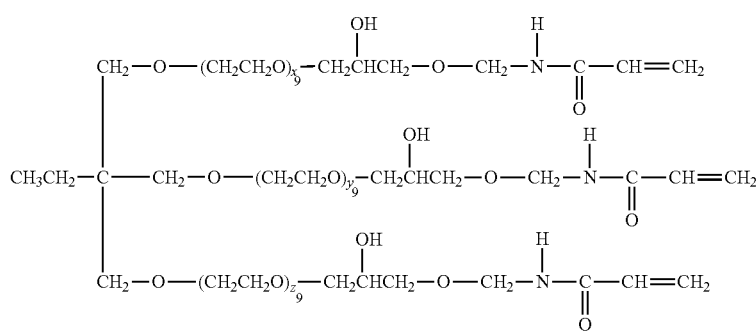

$x_9 + y_9 + z_9 = 3$

The cationic polymerizable compound described above is a compound which has a cationic group and a polymerizable group such as an unsaturated double bond, and for example, it is possible to use an epoxy monomer, an oxetane monomer, or the like. When a cationic polymerizable compound is contained, the cationic property of the ink composition is strengthened due to the inclusion of the cationic group and the mixing of colors is effectively prevented when an anionic ink is used.

Examples of the cationic polymerizable group includes N,N-dimethyl amino ethyl methacrylate, N,N-dimethyl amino ethyl acrylate, N,N-dimethyl amino propyl methacrylate, N,N-dimethyl amino propyl acrylate, N,N-dimethyl amino acrylamide, N,N-dimethyl amino methacrylamide, N,N-dimethyl amino ethyl acrylamide, N,N-dimethyl amino ethyl methacrylamide, N,N-dimethylaminopropyl acrylamide, N,N-dimethyl amino propyl methacrylamide, and a quaternary compound thereof.

Examples of the epoxy monomer include a multivalent alcohol glycidyl ether, a glycidyl ester, a cyclic aliphatic epoxide, and the like.

Furthermore, as an example of the cationic polymerizable group, examples thereof can include groups having the structures below.

[Chem. 7]

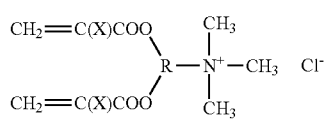

Structure 1

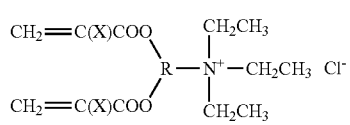

Structure 2

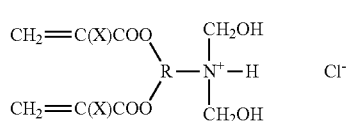

Structure 3

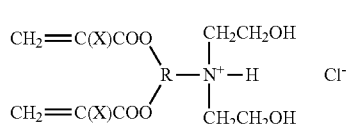

Structure 4

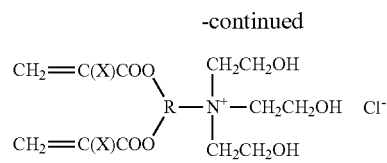

Structure 5

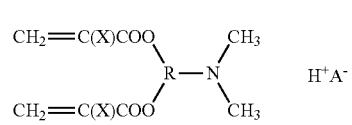

Structure 6

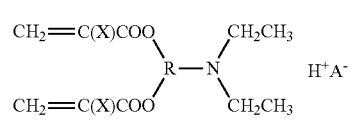

Structure 7

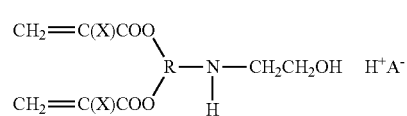

Structure 8

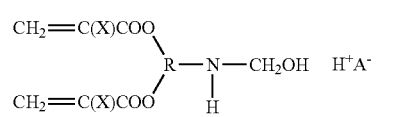

Structure 9

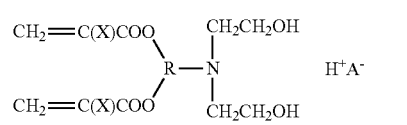

Structure 10

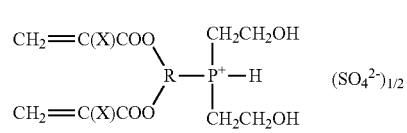

Structure 11

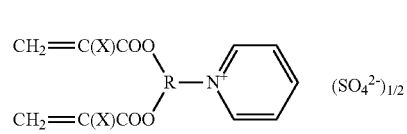

Structure 12

In the structures above, R represents a polyol residue. In addition, X represents H or $CH_3$, and K represents $Cl^-$, $HSO_3^-$ or $CH_3COO^-$. Examples of the compound for introducing the polyol can include glycerin, 1,2,4-butane triol, 1,2,5-pentane triol, 1,2,6-hexane triol, trimethylolpropane, trimethylolmethane, trimethylolethane, pentaerythritol, bisphenol A, alicyclic bisphenol A, or a condensate thereof.

Below, specific examples of the polymerizable compound (cationic compounds 1 to 11) having a cationic group are shown.
[Chem. 8]
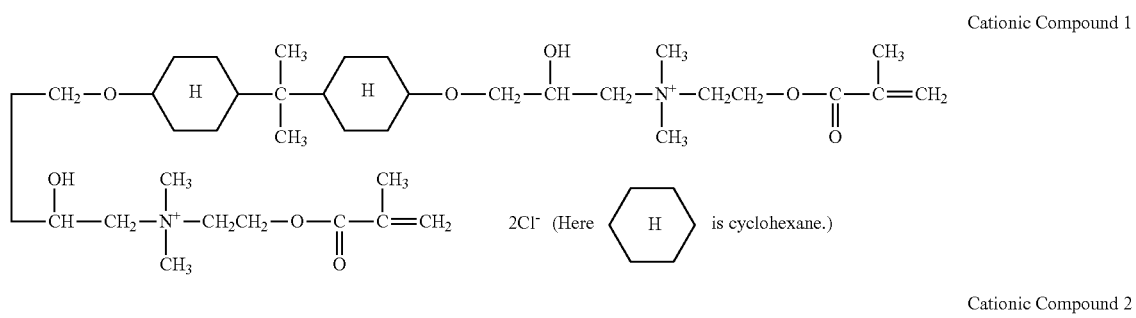
Cationic Compound 1
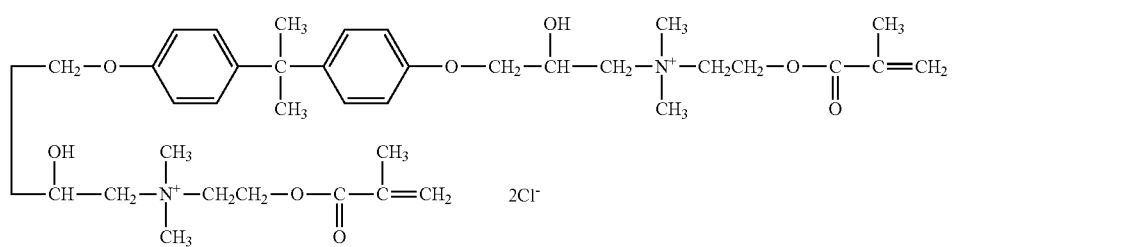
Cationic Compound 2
[Chem. 9]
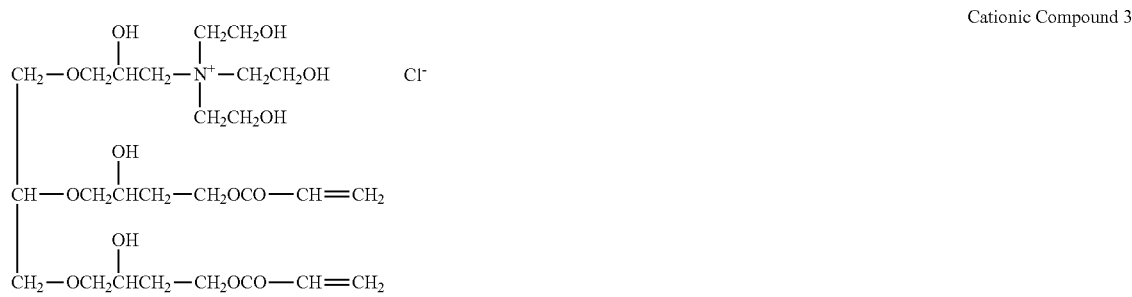
Cationic Compound 3
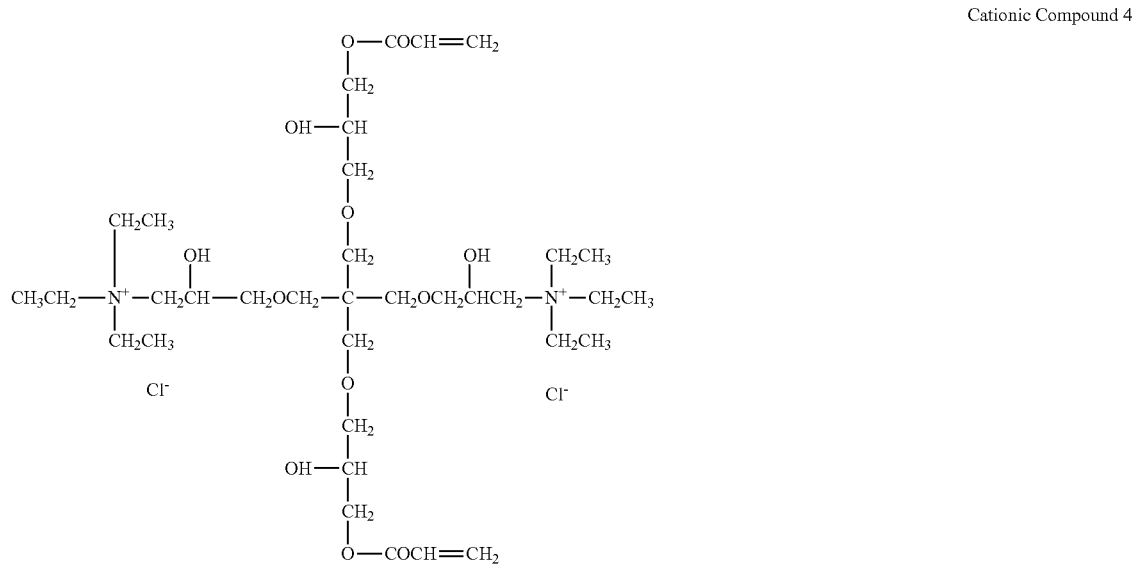
Cationic Compound 4

-continued
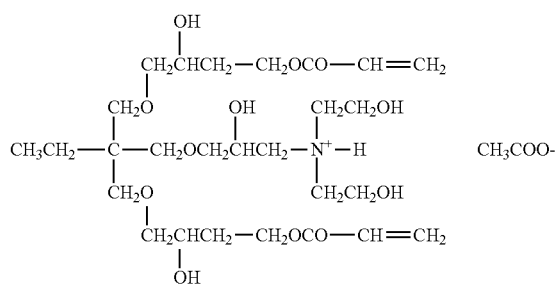
Cationic Compound 5
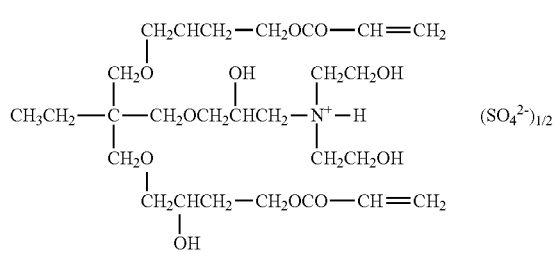
Cationic Compound 6
[Chem. 10]
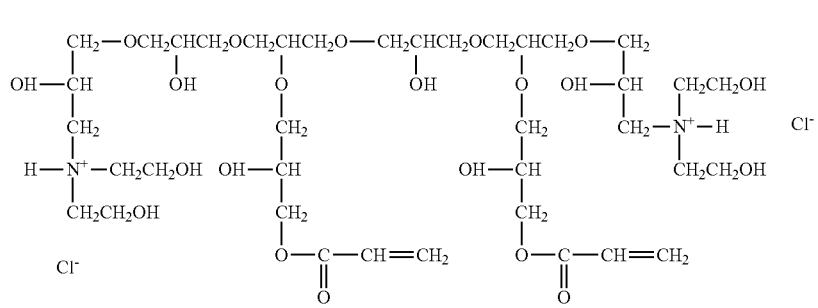
Cationic Compound 7
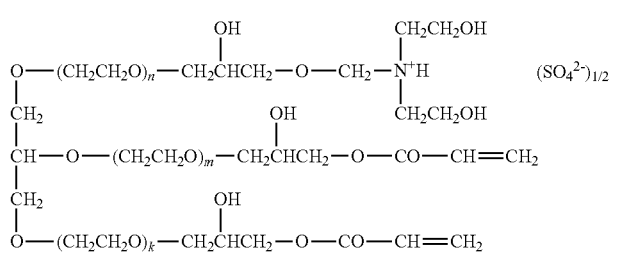
n+m+k=15
Cationic Compound 8
[Chem. 11]
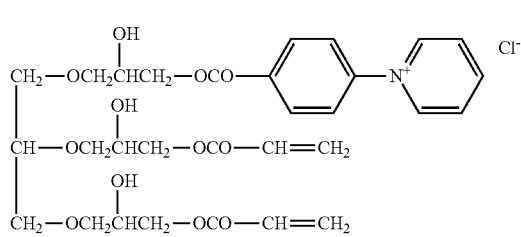
Cationic Compound 9

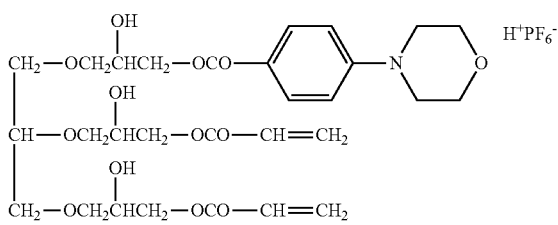

Cationic Compound 10

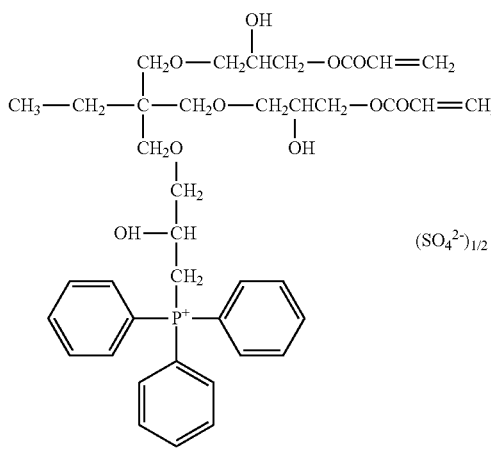

Cationic Compound 11

From the point of view of being able to increase the scratch resistance, as the polymerizable compound in the present invention, a multi-functional monomer is preferable, a monomer with 2 functions to 6 functions is preferable, and a monomer with 2 functions to 4 functions is preferable from the point of view of combining dissolubility and scratch resistance.

Polymer Particles

It is possible for the ink composition of the present invention to contain at least one type of polymer particles. The polymer particles have a function of fixing the ink composition due to increased viscosity by aggregating due to dispersion instability in the ink composition when coming into contact with the treatment liquid which will be described later or a region where this has been dried, and it is possible to further improve the adhesion of the ink composition to the recording medium and the scratch resistance of the image.

It is possible to use the polymer particles as, for example, a latex where a polymer in particle form is dispersed into an aqueous medium. As the polymer, it is possible to use an acrylic resin, a vinyl acetate resin, a styrene-butadiene resin, a vinyl chloride resin, an acrylic-styrene resin, a butadiene resin, a styrene resin a cross-linked acrylic resin, a cross-linked styrene resin, a benzoguanamine resin, a phenol resin, a silicone resin, an epoxy resin, an urethane resin, a paraffin-based resin, a fluorine resin, or the like. Out of these, preferable examples include an acrylic resin, an acrylic-styrene resin, a styrene resin, a cross-linked acrylic resin, and a cross-linked styrene resin.

Out of the polymer particles, self-dispersing polymer particles are preferable. Below, examples of self-dispersing polymer particles will be described in detail.

The self-dispersing polymer particles is a water insoluble polymer which is able to be in a dispersed state in an aqueous medium due to a functional group of the polymer itself (particularly, an acid group or a salt thereof) when in a dispersed state (particularly a dispersed state using a phase inversion emulsification method) when there is no surfactant and has the meaning of particles of a water insoluble polymer which does not contain a free emulsifier.

The self-dispersing polymer particles are preferable from the point of view of discharge stability and liquid stability (particularly dispersion stability) of a system which includes the pigment.

Here, the dispersed state includes both the states of an emulsion state where the water insoluble polymer is dispersed in a liquid state in the aqueous medium and a dispersion state (suspension) where the water insoluble polymer is dispersed in a solid state in the aqueous medium.

The water insoluble polymer of the present invention is preferably a water insoluble polymer which is able to be in a dispersion state where the water insoluble polymer is dispersed in a solid state from the point of view of aggregation speed and fixing when as a liquid composition.

An example of the emulsion or dispersion state of the self-dispersing polymer, that is, a method of preparing the aqueous dispersant of the self-dispersing polymer, includes the phase inversion emulsification method. An example of the phase inversion emulsification method includes a method where an aqueous dispersant which is in an emulsified or dispersed state is obtained by being introduced into water as it is after dissolving or dispersing the self-dispersing polymer in a solvent (for example, a hydrophilic organic solvent or the like) without a surfactant being added, being stirred and mixed in a state where a salt forming group (for example, an acid group) of the self-dispersing polymer is neutralized, and the solvent being removed.

The dispersion state of the self-dispersing polymer particles is a state where, after a solution where 30 g of the water insoluble polymer is dissolved in 70 g of an organic solvent (for example, a methyl ethyl ketone), a neutralizing agent which is able to 100% neutralize the salt forming group of the water insoluble polymer (sodium hydroxide if the salt forming group is anionic and acetic acid if cationic), and 200 g of water are mixed and stirred (apparatus: a stirring apparatus with a stirring blade, number of rotations 200 rpm, 30 minutes, 25° C.), the existence of the dispersion state is able to be confirmed with the naked eye as being stable for at least one week at 25° C. even after the organic solvent has been removed from the mixture solution.

In addition, the water insoluble polymer refers to a polymer where the dissolved amount thereof is 10 g or less when the polymer is dissolved in 100 g of water at 25° C. after being dried for 2 hours at 105° C. and the dissolved amount is preferably 5 g or less and is more preferably 1 g or less. The dissolved amount is the dissolved amount with 100% neutralization by sodium hydroxide or acetic acid according to the type of salt forming group of the water insoluble polymer.

The aqueous medium is configured to contain water and may contain a hydrophilic organic solvent as required. In the present invention, the aqueous medium is preferably configured from water and a hydrophilic organic solution with 0.2 mass % or less with regard to water and more preferably is configured from water.

The main chain skeleton of the water insoluble polymer is not particularly limited, and for example, it is possible to use a vinyl polymer and a condensed polymers (epoxy resin, polyester, polyurethane, polyamide, cellulose, polyether, polyurea, polyimide, polycarbonate, and the like). Out of these, a vinyl polymer is particularly preferable.

As an appropriate example of a vinyl polymer or a monomer which configures a vinyl polymer, examples are disclosed in JP2001-181549A and JP2002-88294A. It is possible to use a vinyl polymer where a dissociative group is introduced at the end of the polymer chain due to radical polymerization of a vinyl monomer using a chain transfer agent or a polymerization initiator which has a dissociative group (or a substituent which can be derived from a dissociative group) and an iniferter, or ionic polymerization using a compound having a dissociative group (or a substituent which can be derived from a dissociative group) in either an initiator or a terminating agent.

Also, as appropriate examples of a condensed polymer and a monomer which configures a condensed polymer, examples are disclosed in JP2001-247787A.

The self-dispersing polymer particles preferably includes a water insoluble polymer including a hydrophilic structural unit and a structural unit derived from an aromatic group containing monomer from the point of view of a self-dispersing property.

The "hydrophilic structural unit" is not particularly limited as long as it is derived from a hydrophilic group containing monomer, and may be derived either from one type of hydrophilic group containing monomer or two types or more of hydrophilic group containing monomers. The hydrophilic group is not particularly limited and may be a dissociative group or a nonionic hydrophilic group.

As the hydrophilic group, a dissociated group is preferable and an anionic dissociative group is more preferable from the point of view of promoting self-dispersion and stability of emulsion or dispersion state which has been formed. Examples of the dissociative group include a carboxyl group, a phosphate group, and a sulfonate group, and out of these, a carboxyl group is preferable from the point of view of fixing in a case of configuring the ink composition.

The hydrophilic group containing monomer is preferably a dissociative group containing monomer is preferable from the point of view of self-dispersing and aggregation, and a dissociative group containing monomer having a dissociative group and an ethylenic unsaturated bond is preferable. Specific examples of the dissociative group containing monomer include an unsaturated carboxylic acid monomer, an unsaturated sulfonic acid monomer, and an unsaturated phosphoric acid monomer.

Specific examples of the unsaturated carboxylic acid monomer include an acrylate, a methacrylate, a crotonate, an itaconate, a maleate, a fumarate, a citraconate, or 2-methacryloyloxymethylsuccinate.

Specific examples of the unsaturated sulfonic acid monomer include a styrene sulfonate, a 2-acrylamide-2-methyl propane sulfonate, a 3-sulfopropyl(meth)acrylate, a bis-(3-sulfopropyl)-itaconate, or the like.

Specific examples of the unsaturated phosphoric acid monomer include vinylphosphonic acid, vinyl phosphate, bis (methacryl oxyethyl)phosphate, diphenyl-2-acryl oyloxyethyl phosphate, diphenyl-2-methacryloyloxyethyl phosphate, dibutyl-2-acryloyloxyethylphosphate, and the like.

In the dissociative group containing monomer, from the point of view of dispersion stability and discharge stability, an unsaturated carboxyl monomer is preferable, an acrylic monomer is more preferable, and acrylate or methacrylate is particularly preferable.

As the acid value of the self-dispersing polymer of the present invention is preferable 150 mg KOH/g or less from the point of view of excellent aggregation when coming into contact with the treatment liquid. Furthermore, the acid value is more preferably 25 to 100 mg KOH/g and is even more preferably 30 to 70 mg KOH/g. When the acid value of the self-dispersing polymer is 25 mg KOH/g or more, the self-dispersion stability is excellent.

From the point of view of self-dispersing and speed of aggregation when in contact with the treatment liquid, the self-dispersing polymer particles preferably include a polymer which has a carboxyl group and a polymer which has a carboxyl group and where the acid value is 25 to 150 mg KOH/g is more preferable, and a polymer which has a carboxyl group and where the acid value is 30 to 100 mg KOH/g is even more preferable.

The aromatic group containing monomer is not particularly limited if it is a compound which contains an aromatic group and a polymerizable group. The aromatic group may be a group derived from an aromatic hydrocarbon or a group derived from an aromatic heterocyclic ring. In the present invention, an aromatic group derived from an aromatic hydrocarbon is preferable from the point of view of particle formation stability in an aqueous medium.

In addition, the polymerizable group may be a polymerizable group of polycondensation or a polymerizable group of polyaddition. From the point of view of particle formation stability in an aqueous medium, the polymerizable group is preferably a polymerizable group of polyaddition and a group having an ethylenic unsaturated bond is more preferable.

The aromatic group containing monomer is preferably a monomer having an aromatic group derived from an aromatic hydrocarbon and an ethylenic unsaturated bond. The aromatic group containing monomer may be used as one type singly or as a combination of two or more types.

Examples of the aromatic group containing monomer include a phenoxyethyl(meth)acrylate, a benzyl(meth)acrylate, a phenyl(meth)acrylate, a styrene-based monomer or the like. Out of these, an aromatic group containing a (meth) acrylate monomer is preferable, at least one type selected from a phenoxyethyl(meth)acrylate, a benzyl(meth)acrylate, and a phenyl(meth)acrylate is more preferable, and phenoxyethyl(meth)acrylate or benzyl(meth)acrylate is even more preferable from the point of view of a balance of the hydrophilic property and the hydrophobic property of a polymer chain and the fixing of the ink.

Here, "(meth)acrylate" has the meaning of an acrylate or a methacrylate.

The self-dispersing polymer are preferably an acrylic resin which includes a structural unit derived from a (meth)acrylate monomer, and an acrylic resin which includes a structural unit derived from an aromatic group containing (meth)acrylate monomer is preferable, and furthermore, the inclusion of a structural unit derived from an aromatic group containing (meth)acrylate monomer and the content thereof being 10 to 95 mass % is preferable. It is possible to improve the stability of the self-emulsion or dispersion state and to further suppress an increase in ink viscosity by the content of the aromatic group containing (meth)acrylate monomer being 10 to 95 mass %. The content of the aromatic group containing (meth)acrylate monomer is more preferably 15 to 90 mass %, is even more preferably 15 to 80 mass %, and is particularly preferably 25 to 70 mass % from the point of view of stability in the self-dispersion state, stabilizing of the particle formation in the aqueous medium due to the hydrophobic interaction of the aromatic rings, and a reduction in the amount of the water soluble component due to the appropriate hydrophobization of the particles.

It is possible for the self-dispersing polymer to be configured using, for example, a structural unit derived from an aromatic group containing monomer and a structural unit derived from a dissociative group containing monomer. Furthermore, other structural units may further be included as required.

The monomer which forms the other structural units is not particularly limited as long as it is a monomer where copolymerization of the aromatic group containing monomer and the dissociative group containing monomer is possible. Out of these, an alkyl group containing monomer is preferable from the point of view of flexibility of a polymer skeleton and easiness of control of the glass transition temperature (Tg).

Examples of the alkyl group containing monomer include an alkyl(meth)acrylate (preferably an alkyl ester of a (meth) acrylate with 1 to 4 carbon atoms) such as methyl(meth) acrylate, ethyl(meth)acrylate, isopropyl(meth)acrylate, n-propyl(meth)acrylate, n-butyl(meth)acrylate, isobutyl (meth)acrylate, t-butyl(meth)acrylate, hexyl(meth)acrylate, or ethylhexyl(meth)acrylate; an ethylenic unsaturated monomer having a hydroxyl group such as hydroxymethyl(meth) acrylate, 2-hydroxyethyl(meth)acrylate, 2-hydroxypropyl (meth)acrylate, 4-hydroxybutyl(meth)acrylate, hydroxypentyl(meth)acrylate, or hydroxyhexyl(meth)acrylate; or a dialkylaminoalkyl(meth)acrylate such as dialkylaminoethyl(meth)acrylate;

a (meth)acrylamide monomer such as a N-hydroxyalkyl (meth)acrylamide such as N-hydroxymethyl(meth)acrylamide, N-hydroxyethyl(meth)acrylamide, N-hydroxybutyl (meth)acrylamide; a N-alkoxyalkyl(meth)acrylamide such as N-methoxymethyl(meth)acrylamide, N-ethoxymethyl (meth)acrylamide, N-(n-,iso)butoxymethyl(meth)acrylamide, N-methoxyethyl(meth)acrylamide, N-ethoxyethyl (meth)acrylamide, or a N-(n-,iso)butoxyethyl(meth) acrylamide or the like.

As the molecular weight range of the water insoluble polymer which configures the self-dispersing polymer particles, a weight average molecular weight of 3,000 to 200,000 is preferable, 5,000 to 150,000 is more preferable, and 10,000 to 100,000 is even more preferable. It is possible to effectively suppress the amount of water soluble component by the weight average molecular weight being 3,000 or more. In addition, it is possible to increase the self-dispersion stability by the weight average molecular weight being 200,000 or less.

Here, the weight average molecular weight is measured by gel permeation chromatography (GPC). The GPC uses HLC-8220 GPC (manufactured by Tosoh Co., Ltd.) and uses the three columns of TSKgeL Super HZM-H, TSKgeL Super HZ-4000, and TSKgeL Super HZ-2000 (manufactured by Tosoh Co., Ltd., 4.6 mm ID×15 cm), and THF (tetrahydrofuran) is used as an eluent. In addition, as conditions, an IR detector is used at a sample concentration of 0.35 mass %, a flow rate of 0.35 ml/min, a sample injection amount of 10 µl, and a measurement temperature of 40° C. In addition, a calibration curve is produced from 8 samples of "standard sample TSK standard, polystyrene" manufactured by Tosoh Co., Ltd.: "F-40", "F-20", "F-4", "F-1", "A-5000", "A-2500", "A-1000", and "n-propylbenzene".

The water insoluble polymer which configures the self-dispersing polymer particles preferably includes a structural unit derived from an aromatic group containing (meth)acrylate monomer (preferably a structural unit derived from phenoxyethyl(meth)acrylate and/or a structural unit derived from benzyl(meth)acrylate) with a copolymerization ratio of 15 to 80 mass % of the total amount of the self-dispersing resin particles from the point of view of controlling the hydrophilic and hydrophobic properties of the polymer.

In addition, from the point of view of controlling the hydrophilic property of the polymer, the water insoluble polymer preferably includes a structural unit derived from an aromatic group containing (meth)acrylate monomer with a copolymerization ratio of 15 to 80 mass %, a structural unit derived from a carboxyl group containing monomer and a structural unit derived from an alkyl group containing monomer (preferably a structural unit derived from alkyl ester of (meth)acrylic acid), and more preferably includes a structural unit derived from phenoxyethyl(meth)acrylate and/or a structural unit derived from benzyl(meth)acrylate with a polymerization ratio of 15 to 80 mass %, a structural unit derived from a carboxyl group containing monomer and a structural unit derived from an alkyl group containing monomer (preferably a structural unit derived from alkyl ester of (meth)acrylic acid having 1 to 4 carbon atoms), and furthermore, in addition, as the water insoluble polymer, it is preferable that the acid value be 25 to 100 and the weight average molecular weight be 3,000 to 200,000 and it is more preferable that the acid value be 25 to 95 and the weight average molecular weight be 5,000 to 150,000.

Below, there are specific examples of the water insoluble polymers which configures the self-dispersing polymer particles (example compounds B-01 to B-19). Here, the present invention is not limited thereto. Here, the numbers in parenthesis represent mass ratios of the copolymer components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/ methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/ acrylic acid copolymer (10/50/35/5)

B-07: benzyl acrylate/methyl methacrylate/acrylic acid copolymer (55/40/5)

B-08: phenoxyethyl acrylate/benzyl acrylate/methacrylic acid copolymer (45/47/8)

B-09: styrene/phenoxyethyl acrylate/butyl methacrylate/ acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

The method for manufacturing the water insoluble polymer which configures the self-dispersing polymer particles is not particularly limited. Examples thereof include a method in which, in the presence of a polymerizable surfactant, emulsion polymerization is performed and the water insoluble polymer and the surfactant are covalent bonded, a method in which a monomer mixture including a hydrophilic group containing monomer and an aromatic group containing monomer is copolymerized by known polarization methods such as solution copolymerization or bulk polymerization. Of the polymerization methods, a solution polymerization method is preferable and a solution polymerization method using an organic solvent is more preferable from the viewpoint of speed of aggregation and ejecting stability when made into the ink composition.

From the viewpoint of the speed of aggregation, it is preferable that the self-dispersing polymer include a polymer synthesized in an organic solvent, the polymer has a carboxyl group (preferably with an acid value is 25 to 50), a part or whole of the carboxyl group in the polymer is neutralized, and a polymer dispersion substance is prepared with water as a continuous phase. That is, in the manufacturing of the self-dispersing polymer particles, it is preferable to be performed by providing a step where the polymer is synthesized in an organic solvent and a dispersing step where an aqueous dispersant is formed so that at least a portion of the carboxyl group of the polymer is neutralized.

The dispersing step preferably includes the following Step (1) and Step (2).

Step (1): A step where a mixture containing the polymer (the water insoluble polymer), an organic solvent, a neutralizing agent, and an aqueous medium is stirred.

Step (2): A step in which the organic solvent is removed from the mixture.

In Step (1), it is preferable that there is a process where, firstly, the polymer (the water insoluble polymer) is dissolved in the organic solvent and a dispersant is obtained by next gradually adding the neutralizing agent and the aqueous medium and mixing and stirring. In this manner, by adding the neutralizing agent and the aqueous medium into a water insoluble polymer solution which is dissolved in the organic solvent, it is possible to obtain the self-dispersing polymer particles with a particle diameter with higher storage stability without a strong shearing force being necessary. The stirring method of the mixture is not particularly limited and it is possible to use mixture stirring apparatus which is typically used or a dispersing unit such as an ultrasonic dispersing unit or a high pressure homogenizer as required.

Examples of the organic solvent include an alcohol-based solvent, a ketone-based solvent, or an ether-based solvent. With regard to the details of the organic solvent, it is possible to apply the description in paragraph [0109] in JP2011-42150A. Out of these, a ketone-based solvent such as methyl ethyl ketone or an alcohol-based solvent such as isopropyl alcohol is preferable and the combined use of the isopropyl alcohol and the methyl ethyl ketone is preferable from the point of view of easing the change in polarity during the phase inversion from an oil-base to a water-base. Due to the combined use of the solvents, it is possible to obtain self-dispersing polymer particles with fine particles where the dispersion stability is high without aggregation settling or bonding of the particles.

The neutralizing agent is used in order for a portion or all of the dissociative group to be neutralized and for the self-dispersing polymer particles to form a stable emulsion or dispersion state in water. In a case where the self-dispersing polymer particles have an anionic dissociative group (for example, a carboxyl group) as the dissociative group, examples of the neutralizing agent which is used include a basic compound such as an organic amine compound, ammonia or a hydroxide compound of an alkali metal. With regard to the details of the neutralizing agent, it is possible to apply the description in paragraph [0110] in JP2011-42150A. Out of these, sodium hydroxide, potassium hydroxide, triethylamine, and triethanolamine are preferable from the point of view of dispersion stability of the self-dispersing polymer particles in water.

These basic compounds are preferably used as 5 to 120 mol % with regard to the 100 mol % of the dissociative group. Here, the details of this ratio are disclosed in paragraph [0111] in JP2011-42150A.

In Step (2), from the dispersant obtained from Step (1), it is possible to obtain an aqueous dispersant of the self-dispersing polymer particles by distilling off the organic solvent and phase inversion to an aqueous phase using a conventional method such as vacuum distillation. The organic solvent in the obtained aqueous dispersed substance is substantially removed and the amount of the organic solvent is preferably 0.2 mass % or less and is more preferable 0.1 mass % or less.

The average particle diameter of the polymer particles is preferably in a range of 1 nm to 70 nm in terms of the volumetric average particle diameter, is more preferably in a range of 2 nm to 60 nm, and is even more preferably in a range of 2 nm to 30 nm. When the volumetric average particle diameter is 2 nm or more, the manufacturing aptitude is improved, and when 70 nm or less, resistance to local blocking is improved.

In addition, in relation to the particle diameter distribution of the self-dispersing polymer particles, there is no particular limitation and any of a wide particle diameter distribution or a simple particle diameter distribution is sufficient. In addition, two or more types of a water insoluble particle may be mixed and used.

Here, the average particle diameter and particle diameter distribution of the self-dispersing polymer particles are determined by measuring the volumetric average particle diameter with a dynamic light scattering method using a particle size distribution measuring instrument NANOTRAC UPA-EX150 (manufactured by NIKKISO Co., Ltd.).

In addition, the glass transition temperature (Tg) of the self-dispersing polymer is preferably 70° C. or more, is more preferably 80° C. or more, and is even more preferably 100° C. or more. When the glass transition temperature (Tg) is 70°

C. or more, resistance to local blocking is improved. There is not particular limit with regard to the upper limit of the glass transition temperature (Tg).

It is possible for the polymer particles to use one type singly or mix two or more types.

As the content of the polymer particles in the ink composition, 1 to 30 mass % of the solid density with regard to the ink composition is preferable and 5 to 15 mass % is more preferable from the point of view of the speed of aggregation, the glossiness of the image, and the like.

In addition, as the ratio of the pigment with regard to the polymer particles (for example, water insoluble pigment particles/self-dispersing polymer particles), 1/0.5 to 1/10 is preferable and 1/1 to 1/4 is more preferable from the point of view of resistance to excessive abrasion of the image and the like.

Above, the self-dispersing polymer particles are described as an example of the preferable polymer particles, but it is possible to use other polymer particles without being limited to the self-dispersing polymer particles. For example, it is possible to appropriately use polymer particles such as an emulsion polymer latex which is typically known by adjusting the configuring monomer, emulsifying agent, dispersion conditions, and the like.

Polymerization Initiator

It is possible for at least one type of polymerization initiator which initiates the polymerization of the polymerizable compound using an active energy ray in the ink composition of the present invention with or without the treatment liquid which will be described later being contained. It is possible for the polymerization initiator to be one type singly or a mixture of two types or more or to be used in combination with a sensitizer.

It is possible for a compound, which is able to initiate a polymerization reaction of the polymerizable compound due to an active energy ray, to be appropriately selected and contained in the polymerization initiator. Examples of the polymerization initiator include a polymerization initiator (for example an optical polymerization initiator) which generates an active type (radical, acid, basic, or the like) due to radiation, light or an electron beam.

Examples of the optical polymerization initiator include acetophenone, 2,2-diethoxyacetophenone, p-dimethyl amino acetophenone, p-dimethyl amino propiophenone, benzophenone, 2-chlorobenzophenone, p,p'-dichloro-benzophenone, p,p'-bis diethylamino benzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethylthiuram mono-sulfide, thioxanthone, 2-chloro thioxanthone, 2-methyl thioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propan-1-one, 2-hydroxy-2-methyl-1-phenyl-1-one, 1-(4-isopropylphenyl)-2-hydroxy-2-methyl propan-1-one, and methylbenzoyl formate. Furthermore, examples include an aromatic diazonium salt, an aromatic halonium salt, an aromatic sulfonium salt, a metallocene compound, and the like such as triphenylsulfonium hexafluorophosphate and diphenyliodonium hexafluoroantimonate.

In a case where the polymerization initiator is included in the ink composition, the content of the polymerization initiator in the ink composition is preferable 1 to 40 mass % with regard to the polymerizable compound and is more preferably 5 to 30 mass %. When the content of the polymerization initiator is 1 mass % or more, the scratch resistance of the image is further improved and it is effective in high speed recording and when the content of the polymerization initiator is 40 mass % or less, it is advantageous in terms of the point of discharge stability.

Examples of the sensitizer include an amine (such as amines including an aliphatic amine or an aromatic group or piperidine), a urea (such as aryl or urea o-tolylthio), a sulfur compound (such as soluble salts of sodium diethyl dithiophosphate or an aromatic sulfinate), a nitrile compound (N,N, di-substituted p-amino benzonitrile), a phosphorus compound (such as tri-n-butyl phosphine or a host feed of sodium diethyldithiocarbamate), a nitrogen compound (such as Michler's ketone, N-nitroso hydroxylamine derivatives, an oxazolidine polymer, tetrahydro-1,3-oxazine compound, formaldehyde, acetaldehyde, and such as a condensation product of a diamine), chlorine compounds (such as carbon tetrachloride and hexachloroethane), a polymer amine of a reactant of epoxy resin and amine, and triethanolamine triacrylate.

It is possible for the sensitizer to be contained in a range which does not damage the effect of the present invention.

Water

The ink composition of the present invention contains water and the amount of the water is not particularly limited. Out of this, the preferable content of water is 10 to 99 mass %, is more preferably 30 to 80 mass %, and is even more preferably 50 to 70 mass %.

Water Soluble Organic Solvent

The ink composition of the present invention may contain a water soluble organic solvent. In a case where the water soluble organic solvent is contained, it is preferable that the content thereof is small and the content of the water soluble organic solvent in the present invention is less than 3 mass % with regard to the total mass of the ink composition.

In the present invention, that the content of the water soluble organic solvent is less than 3 mass % has the meaning that the water soluble organic solvent is not actively contained in the ink composition, and preferably, the water soluble organic solvent is not contained (content: 0 mass %).

The water soluble organic solvent obtains the effect of preventing drying of the ink composition, humectant, and promoting permeation into the paper. Examples of the water soluble organic solvent which may be contained in the ink composition include a multivalent alcohol such as a glycol such as glycerin, 1,2,6-hexane triol, trimethylolpropane, ethylene glycol, propylene glycol, diethylene glycol, triethylene glycol, tetraethylene glycol, penta-ethylene glycol, and dipropylene glycol, and an alkanediol such as 2-butene-1,4-diol, 2-ethyl-1,3-hexanediol, 2-methyl-2,4-pentanediol, 1,2-octanediol, 1,2-hexanediol, 1,2-pentanediol, 4-methyl-1,2-pentanediol, as well as a sugar, a sugar alcohol, a hyaluronic acid, an alkyl alcohol with 1 to 4 carbon atoms, a glycol ether, 2-pyrrolidone, and N-methyl-2-pyrrolidone disclosed in paragraph [0116] of JP2011-42150A. The solvents are able to be used by one type or two or more types being appropriately selected. The multivalent alcohols are effective as a drying prevention agent and as a humectant, and examples thereof include examples in the description in paragraph [0117] of JP2011-42150A. In addition, the polyol compound is preferable as a permeation agent and examples of the aliphatic diol include examples in the description in paragraph [0117] of JP2011-42150A.

Other than the above, examples of the water soluble organic compound include the compounds represented by the structural formula (1).

[Chem. 12]

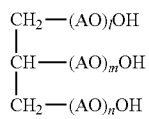

Structural Formula (1)

In the structural formula (1), l, m, and n each independently represent an integer of 1 or more and l+m+n=3 to 15 is satisfied. Out of these, when l+m+n is 3 or more, a curl suppression effect is obtained, and when 15 or less, discharging is excellently maintained. Out of this, 3 to 12 is preferable and 3 to 10 is more preferable. AO represents ethyleneoxy (which may be abbreviated by EO) and/or propyleneoxy (which may be abbreviated by PO), and out of these, the propyleneoxy group is preferable. Each AO of $(AO)_l$, $(AO)_m$, and $(AO)_n$ may each be the same or may each be different.

The details of the compound represented by the structural formula (1) are disclosed in paragraph [0121] to [0125] of JP2011-42150A. The glycerin alkylene oxide adduct may use a commercially available product on the market, and examples thereof include SANNIX GP-250 (average molecular weight of 250), SANNIX GP-400 (average molecular weight of 400), and SANNIX GP-600 (average molecular weight of 600) (all manufactured by Sanyo Chemical Industries, Ltd) and the examples disclosed in paragraph [0126] of JP2011-42150A as a polyoxypropylated glycerin (an ether of polypropylene glycol and glycerin).

Other Components

It is possible for the ink composition according to the present invention to be configured to use other additives other than the components above. Examples of the other additives include known additives such as a polymerization inhibitor, an anti-drying agent (wetting agent), an anti-fading agent, an emulsion stabilizer, a penetration enhancer, an ultraviolet absorbing agent, a preservative, a fungicide, a pH adjusting agent, a surface tension adjusting agent, an anti-foaming agent, a viscosity adjusting agent, a dispersion stabilizer, an anti-rust agent, or a chelating agent. It is typical that each type of additive is directly added to the ink in the case of the ink composition, and in addition, is added to the dispersant after the preparation of the dye dispersant in a case where an oil-based dye is used as the dispersant, but may be added at the time of the preparation in the oil phase or the water phase.

Drying Step

In the drying step of the present invention, at least a portion of the water and at least a portion of the water soluble organic solvent is removed by drying from the image (ink composition) which is formed on the recording medium due to the imparting of the ink composition in the ink imparting step. The drying step is provided before the curing step which will be described later and the curing reaction of the polymerizable compound progresses more smoothly in the curing step by the content of the water and the water soluble organic solvent in the ink composition being reduced. In particular, it is possible to secure sensitivity where image forming is established in a case of image forming at high speed such as a method of image forming due to a single pass method where ink is discharged in a main scanning direction and one line is formed by scanning once.

For example, the effect of the invention is more evident in a case of image forming where the transport speed of the recording medium is 100 to 3000 mm/s, and furthermore, the effect of improving the adhesion and scratch resistance is superior due to the providing of the drying in a case where the transport speed is 150 to 2700 mm/s and more preferably is 250 to 2500 mm/s.

In the drying step of the present invention, it is not necessary for the water and the water soluble organic solvent to be completely dried and the water and the water soluble organic solvent may remain in the image and in the pigment layer. In the drying step, it is instead preferable that there is drying so that the water and the water soluble organic solvent remain in a range where the UV curing reaction does not deteriorate.

In the drying step, it is preferable that, out of the water which is included in the ink composition (image) which is imparted as the maximum imparting amount, at least a portion of the water which is included in the ink composition (that is, the image which is formed on the recording medium using the ink composition) which is imparted onto the recording medium in the ink imparting step is removed with the drying conditions where 60 to 80 mass % is removed (may be referred to below as the "drying amount"). When the amount of the removed water is 60 mass % or more, it is possible to suppress cockling and excellently maintain adhesion of the image. In addition, when the amount of the removed water is 80 mass % or less, the adhesion of the image is excellent.

The drying conditions may be set based on the maximum imparting amount of the ink composition in the ink imparting step which is appropriately set as required. The generation of cockling is suppressed and an image with superior adhesion is obtained due to the water in the ink composition which includes a pigment being removed with the drying conditions.

The drying amount in the drying step is able to be calculated as follows. That is, a water amount $W_0$ which is included in the image which is formed using the maximum ink imparting amount without the drying step being provided and a water amount $W_1$ which is included in the image which is formed using the maximum ink imparting amount with the drying step being provided with certain drying conditions are each measured. Next, by determining the difference between $W_0$ and $W_1$ and the ratio with regard to $W_0$ ($\{(W_0-W_1)/W_0\} \times 100$ [mass %]), the drying amount (mass %) is calculated as a water amount which is removed due to the drying step. Here, the water amount which is included in the image is measured using a Karl Fischer method. As the water amount in the present invention, the water amount which is measured with normal measuring conditions using a Karl Fischer moisture meter MKA-520 (manufactured by Kyoto Electronic Manufacturing Co. Ltd.).

The water amount (drying amount) in the ink composition which is removed in the drying step is preferably 60 to 80 mass %, is more preferably 65 to 80 mass %, and is even more preferably 70 to 80 mass % with regard to the total water amount of the ink composition which is imparted with the maximum imparting amount as 15 ml/m$^2$ or less from the point of view of the curing efficiency after drying being excellently maintained.

In addition, the drying is preferably started within 5 seconds from the point in time of the landing of the liquid droplets of the ink composition on the recording medium. Here, "within 5 seconds from the point in time of the landing" has the meaning of wind being blown or heat being applied to the image within 5 seconds from the landing of the ink droplets. For example, the drying starts within 5 second from the landing by the recording medium being transported to the drying region within 5 seconds from the landing of the ink droplets.

The time until the starting of the drying from the landing of the ink droplets is preferably within 3 seconds.

The drying is performed using heating means for heating using a heat generator such as a nichrome wire heater, wind blowing means for using wind such as a dryer, or means where these are used in combination. Examples of the heating method include a method where heat is supplied using a heater or the like from an opposite side to the image forming surface of the recording medium, a method where a warm wind or a hot wind is blown against the image forming surface of the recording medium, a heating method where an infrared heater is used. The heating may be performed by a plurality of combinations of these.

Curing Step

In the curing step in the present invention, curing is carried out by an active energy ray being irradiated with regard to a formed image after the drying step. Due to the irradiation of the active energy ray, the polymerizable compound in the ink composition is polymerized and a curing film which includes the pigment is formed. Due to this, the abrasion resistance of the formed image is further improved.

As the active energy ray, there is no particular limitation as long as it is possible for the polymerizable compound to be polymerized. For example, examples thereof can include an ultraviolet ray, an electron beam, or the like, and out of these, an ultraviolet ray is preferable from the point of view of ease of availability. In addition, as the generation source of the active energy ray, examples include an ultraviolet irradiation lamp (halogen lamp, high-pressure mercury lamp, and the like), a laser, a LED, an electron irradiation apparatus, or the like.

As the means for irradiating the ultraviolet ray, means for normal using may be used, and particularly, an ultraviolet irradiation lamp is appropriate. As the ultraviolet irradiation lamp, a so-called low-pressure mercury lamp where the vapor pressure of the mercury is 1 to 10 Pa during lighting, a high-pressure mercury lamp, a mercury lamp where a fluorescent substance is coated, a UV-LED light source, and the like. The light spectrum in the ultraviolet region of the mercury lamps and the UV-LED is 450 nm or less and is particularly in the range of 184 nm to 450 nm, and is appropriate for effectively causing a reaction in the polymerizable compound in the ink composition which is black or colored. In addition, in terms of the mounting of the light source in a printer, a power source with a small size is appropriate with regard to the point of being able to be used. As a mercury lamp, for example, a metal halide lamp, a high-pressure mercury lamp, an ultra-high pressure mercury lamp, a xenon flash lamp, a deep UV lamp, a lamp where mercury is excited with no electrodes from the outside using a microwave, a UV laser, and the like are able to be applied. Since the range includes a light wavelength region, it is possible to basically apply if the size of the power source, the input strength, the lamp shape, and the like are permissible. The light source is selected in combination with the sensitivity of the polymerizable compound which is used.

The ultraviolet strength is preferably 500 to 5000 mW/cm$^2$ in the effective wavelength region for the curing. When the irradiation strength is weak, the forming of an image with high quality and robustness is not achieved. In addition, when the irradiation strength is too strong, the recording medium is damaged and fading of the colorant is generated.

Treatment Liquid Imparting Step

The image forming method of the present invention preferably has, in addition to the above, a treatment liquid imparting step where a treatment liquid, which includes an aggregation component which forms an aggregate when coming into contact with the ink composition, is imparted onto the recording medium before the ink imparting step. It is possible to further excellently demonstrate the drying effect above by imparting the treatment liquid which aggregates a component in the ink composition.

The treatment liquid which is imparted onto the recording medium forms an image by coming into contact with the ink composition. In this case, dispersant particles such as the pigment, the polymer particles, and the like in the ink composition aggregate and the image is fixed on the recording medium. Here, the treatment liquid contains at least the aggregation component which aggregates the components in the ink composition.

It is possible to perform the imparting of the treatment liquid by applying a known method such as a coating method, an ink jet method, an immersion method, or the like. As the coating method, it is possible to be performed using a known coating method which uses a direct gravure coater, an offset gravure coater, an extrusion die coater, an air doctor coater, a blade coater, a rod coater, a knife coater, a squeeze coater, a reverse roll coater, a bar coater, or the like. The details of the ink jet method are as already described.

The treatment liquid imparting step may be provided either before or after the ink imparting step which uses the ink composition. In the present invention, a format is preferable where the ink imparting step is provided after the imparting of the treatment liquid in the treatment liquid imparting step. Specifically, a format is preferable where the treatment liquid for aggregating the pigment and/or the polymer particles in the ink composition is imparted into the recording medium in advance and there is imaging by imparting of the ink composition so as to come into contact with the treatment liquid which is imparted onto the recording medium. Due to this, the drying effect is further improved, the image forming is sped up, and an image with high density and resolution can be obtained even with image forming at a high speed.

As the imparting amount of the treatment liquid, there is no particular limitation as long as aggregation of the ink composition is possible, and preferably, it is possible for the imparting amount of the aggregation component to be an amount which is 0.1 g/m$^2$ or more. Out of this, the imparting amount of the aggregation component is preferably an amount which is 0.2 g/m$^2$ to 0.7 g/m$^2$. When the imparting amount of the aggregation component is 0.1 g/m$^2$ or more, excellent high-speed aggregation is maintained according to various usage formats of the ink composition. In addition, that the imparting amount of the aggregation component is 0.7 g/m$^2$ or less is preferable from the point where there is no adverse effect (a change in glossiness or the like) on the surface of the recording medium where imparting has been carried out.

In addition, in the present invention, it is preferable to provide the ink imparting step after the treatment liquid imparting step and further provide a heating and drying step where the treatment liquid on the recording medium is heated and dried until the ink composition is imparted after the treatment liquid is imparted into the recording medium. Due to the treatment liquid being heated and dried in advance before the ink imparting step, the ink coloration such as bleeding prevention is excellent and it is possible to record a visible image with excellent color density and color phase.

The heating and drying is performed using known heating means such as a heater, wind blowing means for using wind such as a dryer, or means where these are used in combination. Examples of the heating method include a method where heat is supplied using a heater or the like from an opposite side to the surface of the recording medium where the treatment liquid was imparted onto, a method where a warm wind or a hot wind is blown against the surface of the recording medium where the treatment liquid was imparted onto, a heating method where an infrared heater is used, and the heating may be performed by a plurality of combinations of these.

Treatment Liquid

The ink composition of the present invention is appropriately used as an ink set in combination with the treatment liquid which includes the aggregation component which forms an agglutinate by aggregating the component in the ink composition when coming into contact with the ink composition.

The treatment liquid in the present invention includes at least the aggregation component which aggregates the component in the ink composition which has already been described, and preferably further includes the polymerization initiator. In addition, it is possible for the treatment liquid to be configured using other further components as required. By an image being formed using the treatment liquid along with the imparting of the ink composition, it is possible to speed up the ink jet recording, and in addition, it is possible to form an image where drawing is superior with high density and resolution (for example reproduction of fine lines and ultra-fine portions) even with high-speed recording.

The aggregation component may be a compound which is able to change the pH of the ink composition, may be a multivalent metal salt, or may be a cationic polymer. In the present invention, a compound which is able to change the pH of the ink composition is preferable and a compound which is able to reduce the pH of the ink composition is more preferable from the point of view of the aggregation of the ink composition.

Examples of the compound which is able to reduce the pH of the ink composition can include an acidic substance.

Examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivative compounds of these, salts of these, or the like.

The acidic substance may be used as one type singly or two or more types may be used in combination.

In a case where the treatment liquid includes the acidic substance, the pH of the treatment liquid (25° C.) is preferably 6 or less, the pH is more preferably 4 or less, is even more preferably in the range of 1 to 4, and the pH is particularly preferably 1 to 3. At this time, the pH of the ink composition (25° C.) is preferably 7.5 or more (more preferably 8.0 or more).

Out of these, a case is preferable where the pH of the ink composition (25° C.) is 8.0 or more and the pH of the treatment liquid (25° C.) is 0.5 to 4 from the point of view of image density, resolution, and speeding up of the ink jet recording.

Out of these, as the aggregation component in the present invention, the acidic substance with high water solubility is preferable, and from the point of view of increases the aggregation and fixing the entirety of the ink, an organic acid is preferable, a divalent or more organic acid is more preferable, and an acidic substance which is divalent or more and trivalent or less is particularly preferable. An organic acid where the first pKa thereof is 3.5 or less is preferable and an acidic substance of 3.0 or less is more preferable as the di- or higher-valent organic acid. Specifically, examples thereof appropriately include phosphoric acid, oxalic acid, malonic acid, citric acid, and the like.

Examples of the multivalent metal salt can include a salt of an alkaline earth metal which belongs to the second classification in the periodic table (for example, magnesium and calcium), a transition metal which belongs to the third classification in the periodic table (for example, lanthanum), a cation from the thirteenth classification in the periodic table (for example, aluminum), or a lanthanide (for example, neodymium). As the metal salt, a carboxylate salt (a salt of formic acid, acetic acid, benzoic acid, or the like), nitrate, a chloride compound, or thiocyanate is appropriate. Out of these, a calcium salt or a magnesium salt of carboxylic acid (formic acid, acetic acid, benzoic acid, or the like), a calcium salt or a magnesium salt of nitric acid, calcium chloride, magnesium chloride, or a calcium salt or a magnesium salt of thiocyanic acid are preferable.

As the cationic polymer, it is preferable to select a polymer from a poly (vinyl pyridine) salt, a poly alkyl amino ethyl acrylate; a polyalkyl amino ethyl methacrylate, a poly (vinyl imidazole), a polyethylene imine, a polybiguanido, and a polyguanido. The cationic polymer may be used as one type singly or two or more types may be used in combination. Out of the cationic polymers, a polyguanido (preferably, a poly (hexamethylene guanidine) acetate, a polymonoguanido, a polymeric biguanide), a polyethylene imine, or a poly (vinyl pyridine) which are effective from the point of view of the speed of aggregation are preferable.

In addition, as the weight average molecular weight of the cationic polymer, small is preferable from the point of view of viscosity of the treatment liquid. In a case where the treatment liquid is imparted onto the recording medium using an ink jet method, the weight average molecular weight is preferably 500 to 500,000, is more preferably 700 to 200,000, and is even more preferably 1,000 to 100,000. When the weight average molecular weight is 500 or more, it is advantageous from the point of view of the speed of aggregation, and when 500,000 or less, it is advantageous from the point of discharge reliability. Here, there is no limitations in a case where the treatment liquid is imparted into the recording medium with a method other than ink jet.

The aggregation component is able to be used as one type singly or the mixing of two or more types.

As the content of the aggregation component which aggregates the ink component in the treatment liquid, 1 to 50 mass % is preferable, 3 to 45 mass % is more preferable, and the range of 5 to 40 mass % is even more preferable.

It is possible for the treatment liquid to contain at least one type of the polymerization initiator which initiates polymerization of the polymerizable compound in the ink composition using the active energy ray with or without being contained in the ink composition. It is possible for the polymerization initiator to be one type singly or the mixing of two or more types or to be used along with a sensitizer.

The polymerization initiator which is used in the treatment liquid is able to be appropriately selected from a compound which is able to initiate a polymerization reaction in the polymerizable compound using the active energy ray in the same manner as the ink composition. Examples of the polymerization initiator include a polymerization initiator (for example a photoinitiator) which generates an active type (radical, acid, basic, or the like) due to radiation, light or an electron beam. The details of the photoinitiator are has been described with regard to the ink composition.

In the present invention, the polymerization initiator may be contained in the ink composition, the treatment liquid, or both, but a format where the polymerization initiator is contained in at least the ink composition is preferable from the point of the polymerization reaction and the curing, and subsequently, the point of view of an effect of improving the adhesion and the scratch resistance of the image.

In addition, the treatment liquid may further contain other additives other than these components in a range which does not deteriorate the effect of the present invention. Examples of the other additives include known additives such as a drying prevention agent (humectant), an anti-fading agent, an emulsion stabilizer, a penetration enhancer, an ultraviolet absorbing agent, a preservative, a fungicide, a pH adjusting agent, a surface tension adjusting agent, an anti-foaming agent, a viscosity adjusting agent, a dispersing agent, a dispersion stabilizer, an anti-rust agent, or a chelating agent.

Ink Jet Recording Apparatus

Next, an example of an ink jet recording apparatus which is appropriate for realizing the image forming method of the present invention will be specifically described with reference to FIG. 1. FIG. 1 is a schematic configuration view illustrating a configuration example of an entire ink jet recording apparatus.

As shown in FIG. 1, the ink jet recording apparatus is provided with a treatment liquid imparting section 12 which is provided with a treatment liquid discharging head 12S which discharges treatment liquid, a treatment liquid drying zone 13 which is provided with heating means (not shown) for drying the treatment liquid which has been imparted, an ink discharging section 14 which discharges each type of the ink composition, and an ink drying zone 15 which dries the ink composition which has been discharged, sequentially toward the transport direction of the recording medium (in the direction of the arrow in the diagram). In addition, an ultraviolet ray irradiation section 16 which is provided with an ultraviolet ray irradiation lamp 16S is provided at a downstream side of the ink drying zone 15 in the transport direction of the recording medium.

The recording medium which is fed in the ink jet recording apparatus is sent in order to the treatment liquid imparting section 12, the treatment liquid drying zone 13, the ink discharging section 14, the ink drying zone 15, and the ultraviolet ray irradiation section 16 using transport rollers from a feeding section which feeds the recording medium from a case which is filled with the recording media and is accumulated in an accumulation section. Other than the method using the transport rollers, a drum transporting method which uses a drum shaped member, a stage transport method which uses a stage, or the like may be adopted in the transporting.

Out of the plurality of transport rollers which are provided, at least one of the rollers is able to be a driving roller which transmits the power of a motor (not shown). The recording medium is transported by a predetermined transport amount in a predetermined direction by the driving roller which is rotated by the motor being rotated at a set speed.

The treatment liquid discharging head 12S which is linked to a retention tank which retains the treatment liquid is provided in the treatment liquid imparting section 12. The treatment liquid discharging head 12S discharges the treatment liquid from a discharge nozzle which is arranged to oppose the recording surface of the recording medium and is able to imparting liquid droplets of the treatment liquid onto the recording medium. Here, the treatment liquid imparting section 12 is not limited to the discharging from a head with a nozzle shape and it is possible to adopt a coating method using a coating roller. The coating method is able to easily impart the treatment liquid over substantially the whole surface which includes the image region where ink droplets are landed on the recording medium using the ink discharging section 14 which is arranged at a downstream side. In order for the thickness of the treatment liquid on the recording medium to be constant, for example, a method may be adopted such as using an air knife or arranging a member having a sharp corner to provide a gap with the recording medium which corresponds to a regulation amount of the treatment liquid.

The treatment liquid drying zone 13 is arranged at a downstream side of the treatment liquid imparting section 12 in the transport direction of the recording medium. It is possible for the treatment liquid drying zone 13 to be configured from a known heating means such as a heater, wind blowing means for using wind such as a dryer, or means where these are used in combination. Examples of the heating method include a method where a heat generator such as a heater is arranged at an opposite side to a surface where a blocking layer is formed in the recording medium (for example, below the transport mechanism which transports by being mounted with the recording medium in a case where the recording medium is automatically transported), a method where a warm wind or a hot wind is blown against a surface where a blocking layer is formed in the recording medium, a heating method where an infrared heater is used, and the heating may be performed by a plurality of combinations of these.

In addition, since the surface temperature of the recording medium changes due to the type of recording medium (material, thickness, and the like), the ambient temperature, and the like, it is preferable that a blocking layer is formed while the temperature is controlled by providing a temperature measuring unit which measures the surface temperature of the recording medium and a control mechanism where a value of the surface temperature of the recording medium measured by the temperature measuring unit is fed back. As the temperature measuring unit which measures the surface temperature of the recording medium, a contact or non-contact thermometer is preferable.

In addition, solvent removal may be performed using a solvent removal roller or the like. As other formats, a method can be used where surplus solvent is removed from the recording medium using an air knife.

The ink discharging section 14 is arranged at the downstream side of the treatment liquid drying zone 13 in the transport direction of the recording medium. Recording heads (ink discharge heads) 30K, 30C, 30M, and 30Y which are each linked to ink retaining sections which retain each color of ink of black (K), cyan (C), magenta (M), and yellow (Y) are arranged in the ink discharging section 14. Ink compositions, which contain pigments corresponding to each color phase, resin particles, the water soluble organic solvent, and water, is retains in each of the ink retaining section which are not shown and are supplied to the respective ink discharge heads 30K, 30C, 30M, and 30Y as required when recording an image. In addition, it is possible to further provide recording heads 30A and 30B for discharging specialized ink as shown in FIG. 1 in the downstream side of the ink discharge heads 30K, 30C, 30M, and 30Y in the transport direction so that it is possible to discharge specialized ink as required.

The ink discharge heads 30K, 30C, 30M, and 30Y discharge ink corresponding to each image from the discharge nozzles which are arranged to oppose the recording surface of the recording medium. Due to this, each color of ink is imparted onto the recording surface of the recording medium and a color image is recorded.

Any of the treatment liquid discharge head 12S and the ink discharge heads 30K, 30C, 30M, 30Y, 30A, and 30B may be a full line head where a plurality of discharge ports (nozzles)

are lined up over the maximum recording width of the image (maximum recording width) which is recorded on the recording medium. It is possible to perform image recording on the recording medium at a high speed compared to a serial type where recording is performed while a shuttle head with a short dimensions scanning back and forth in the width direction of the recording medium (a direction which is orthogonal to the transport direction in the transport surface of the recording medium). In the present invention, any of recording using a serial type or a method where comparative high speed recording is possible, for example, recording using a method where recording is possible by discharging in a main scanning direction using a single pass which forms one line by scanning once may be adopted, but a high quality image with high reproduction is able to be obtained even with the method using a single pass according to the image recording method of the present invention.

Here, the treatment liquid discharge head 12S and the ink discharge heads 30K, 30C, 30M, 30Y, 30A, and 30B all have the same configuration.

The imparting amount of the treatment liquid and the imparting amount of the ink composition are preferably adjusted as required. For example, the imparting amount of the treatment liquid may be changed in order to adjust the properties such as the viscosity of the aggregate which is possible due to the mixing of the treatment liquid and the ink composition according to the recording medium.

The ink drying zone 15 is arranged at a downstream side of the ink discharging section 14 in the transport direction of the recording medium. The ink drying zone 15 is able to be configured in the same manner as the treatment liquid drying zone 13.

The ultraviolet irradiation section 16 is arranged further to a downstream side of the ink drying zone 15 in the transport direction of the recording medium, irradiates an ultraviolet ray using the ultraviolet ray irradiation lamp 16S which is provided in the ultraviolet irradiation section 16, and polymerizes and cures the monomer components in the image after the drying of the image. The ultraviolet ray irradiation lamp 16S irradiates the whole recording surface using a lamp which is arranged to oppose the recording surface of the recording medium and preforms curing of the whole image. Here, the ultraviolet irradiation section 16 is not limited to the ultraviolet ray irradiation lamp 16S and it is possible for a halogen lamp, high-pressure mercury lamp, a laser, a LED, an electron irradiation apparatus, or the like to be adopted.

The ultraviolet irradiation section 16 may be arranged either before or after the ink drying zone 15 and may be arranged both before and after the ink drying zone 15.

In addition, it is possible for heating means for carrying out a heating process on the recording medium to be arranged in the transportation path from a feeding section to the accumulation section in the ink jet recording apparatus. For example, by arranging the heating means in a desired position such as the upstream side of the treatment liquid drying zone 13 or between the ink discharging section 14 and the ink drying zone 15, it is possible for drying and fixing to be effectively performed by increasing the temperature of the recording medium to a desired temperature.

Examples

Below, the present invention will be further specifically described using examples, but the present invention is not limited to the examples below as long as the gist thereof is not exceeded. Here, unless otherwise mentioned, "parts" is based on mass.

Preparation of Aqueous Ink
1. Preparation of Cyan Ink C1
Preparation of Cyan Dispersant Solution A mixed solution was prepared where 6 parts of styrene, 11 parts of stearyl methacrylate, 4 parts of styrene macromer AS-6 (manufactured by Toagosei Co., Ltd.), 5 parts of BLENMER PP-500 (manufactured by NOF Corporation), 5 parts of methacrylic acid, 0.05 parts of 2-mercaptoethanol and 24 parts of methyl ethyl ketone were added into a reaction vessel.

On the other hand, a mixed solution was prepared where 14 parts of styrene, 24 parts of stearyl methacrylate, 9 parts of styrene macromer AS-6 (manufactured by Toagosei Co., Ltd.), 9 parts of BLENMER PP-500 (manufactured by NOF Corporation), 10 parts of methacrylic acid, 0.13 parts of 2-mercaptoethanol, 56 parts of methyl ethyl ketone and 1.2 parts of 2,2'-azobis(2,4-dimethylvaleronitrile) were added into a dropping funnel.

Next, the mixed solution in the reaction vessel was heated to 75° C. while being stirred under a nitrogen atmosphere, and the mixed solution in the dropping funnel was slowly added dropwise over one hour. After the completion of dropwise addition, the solution was stirred for 2 hours at 75° C. After this, a solution in which 1.2 parts of 2,2'-azobis(2,4-dimethylvaleronitrile) was dissolved in 12 parts of methyl ethyl ketone was added dropwise thereto over 3 hours and was aged for 2 hours at 75° C., aged for 2 hours at 80° C., and a polymer dispersant solution was obtained.

A portion of the obtained polymer dispersant solution was concentrated by removing the solvent, the obtained solid content was diluted with tetrahydrofuran to be 0.1% by mass, and the weight average molecular weight of the polymer dispersant was measured by linking the three of TSKgeL Super HZM-H, TSKgeL Super HZ-4000, and TSKgeL Super HZ-2000 in series and using a high-speed GPC (gel permeation chromatography) HLC-8220 GPC. As a result, the weight average molecular weight was 25,000 in terms of polystyrene conversion. In addition, the acid value was 80 mg KOH/g.

Next, 5.0 g in terms of conversion to solid content of the polymer dispersant solution, 10.0 g of Pigment Blue 15:3 (manufactured by Dainichiseika Color & Chemicals Manufacturing Co., Ltd.) as a cyan pigment, 40.0 g of methyl ethyl ketone, 8.0 g of 1 mol/L of sodium hydroxide, 82.0 g of ion-exchanged water, and 300 g of 0.1 mm zirconia beads were placed in a vessel, and the obtained mixture was dispersed for 6 hours at 1000 rpm with a ready mill dispersing machine (manufactured by Aimex Co., Ltd.). The obtained dispersion liquid was concentrated in an evaporator under reduced pressure until the methyl ethyl ketone was able to be sufficiently removed and was further concentrated until the concentration of the water dispersible pigment was 10 mass %, and a cyan dispersion liquid C1 where the water dispersible pigment is dispersed was prepared.

The volumetric average particle diameter (secondary particles) of the obtained cyan dispersion liquid C1 was 77 nm when measured by a dynamic light scattering method using a MICROTRAC particle size distribution analyzer (Version 10.1.2-211BH (trade name) manufactured by Nikkiso Co., Ltd.).

Synthesizing of Self-Dispersing Polymer Fine Particles

In a 2-liter three-necked flask equipped with a stirrer, a thermometer, a reflux condenser, and a nitrogen gas inlet tube, 360.0 g of methyl ethyl ketone was inserted and the temperature was raised to 75° C. While the temperature inside the flask was maintained at 75° C., a mixed solution containing 180.0 g of phenoxyethyl acrylate, 162.0 g of methyl methacrylate, 18.0 g of acrylic acid, 72 g of methyl ethyl ketone, and 1.44 g of "V-601" (manufactured by Wako Pure Chemical Industries, Ltd.) was added dropwise at a constant rate so that the dropwise addition was completed in 2 hours. After completion of the dropwise addition, a solution containing 0.72 g of "V-601" and 36.0 g of methyl ethyl ketone was added to this, and after the mixture was stirred for 2 hours at 75° C., a solution containing 0.72 g of "V-601" and 36.0 g of isopropanol was added thereto and stirred for 2 hours at 75° C. After this, the temperature was raised to 85° C. and stirring was continued for another 2 hours and a resin solution of a phenoxyethyl acrylate/methyl methacrylate/acrylic acid (=50/45/5 [mass ratio]) copolymer was obtained.

The weight average molecular weight (Mw) of the obtained copolymer measured in the same manner as above was 64,000 (calculated using polystyrene conversion using gel permeation chromatography (GPC)), and the acid value was 38.9 mg KOH/g.

Next, 668.3 g of the obtained resin solution was weighed, 388.3 g of isopropanol and 145.7 ml of a 1 mol/L aqueous NaOH solution were added and the temperature inside the reaction vessel was raised to 80° C. Next, 720.1 g of distilled water was added dropwise at a rate of 20 ml/min and after converted to an aqueous dispersion, the temperature inside the reaction vessel was maintained for 2 hours at 80° C., for 2 hours at 85° C., and for 2 hours at 90° C. under atmospheric pressure. After this, the pressure inside the reaction vessel was reduced and a total of 913.7 g of isopropanol, methyl ethyl ketone and distilled water was removed, and an aqueous dispersant of self-dispersing polymer fine particles P-1 with a solid concentration of 28.0 mass % was obtained.

After the cyan dispersant solution C1 was prepared as described above, an ink with the composition below was prepared using the aqueous dispersant of self-dispersing polymer fine particles P-1, an organic solvent, a surfactant, and ion-exchanged water. After the preparation, large particles were removed by passing the obtained ink through a 5 μm filter and a cyan ink (cyan ink C1) was formed.

| Composition of Cyan Ink C1 | |
|---|---|
| Cyan Dispersant C1 (concentration of water dispersible pigment: 10 mass %) | 20 mass % |
| Hydroxyethyl acrylamide (monofunctional polymerizable compound A-1 described below) | 5 mass % |
| Nonionic polymerizable compound (bifunctional polymerizable compound B-1 described below) | 5 mass % |
| SANNIX GP250 (manufactured by Sanyo Chemical Industries, Ltd.; hydrophilic organic solvent) | 2 mass % |
| Olfin E1010 (manufactured by Nissin Chemical Industry Co., Ltd.) | 1 mass % |
| Irgacure 2959 (manufactured by Nihon Chiba-Geigy K. K.; photoinitiator) | 3 mass % |
| Aqueous dispersant of self-dispersing polymer fine particles P-1 (Solid concentration: 28.0 mass %) | 18 mass % |
| Ion-exchanged water | 46 mass % |

[Chem. 13]

A-1
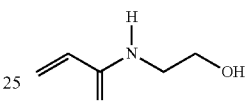

E-1
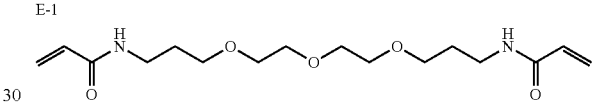

2. Preparation of Cyan Inks C2 to C10

C2 to C10 were prepared in the same manner as the preparation of the cyan ink C1 except that the ink compositions were changed as shown in the following Table 1 in the preparation of the cyan ink C1.

TABLE 1

| | | C1 | C2 | C3 | C4 | C5 | C6 | C7 | C8 | C9 | C10 |
|---|---|---|---|---|---|---|---|---|---|---|---|
| Pigment Dispersant | Cyan dispersant C1 | 20 | 20 | 20 | 20 | 20 | 20 | 20 | 20 | 20 | 20 |
| Polymerizable Compound | Monofunctional polymerizable compound A-1 | 5 | 10 | 10 | 15 | 20 | 25 | 35 | 15 | — | 10 |
| | Bifunctional polymerizable compound B-1 | 5 | 5 | 10 | 10 | 10 | 10 | 10 | 10 | — | 5 |
| Water Soluble Organic Solvent | GP250 | 2 | 2 | — | — | — | — | — | — | | 5 |
| | Glycerin | | | | | | | | | 20 | |
| | 2-ethyl-1,3-hexane diol | | | | | | | | | 2 | |
| | Triethanolamine | | | | | | | | | 0.3 | |
| Surfactant | Olfin E1010 | 1 | 1 | 1 | 1 | 1 | 1 | 1 | 1 | | 1 |
| | FS-300 | | | | | | | | | 2.5 | |
| Photopolymerization initiator | Irgacure 2959 | 3 | 3 | 3 | 3 | 3 | 3 | 3 | — | — | 3 |
| Aqueous dispersant of self-dispersing polymer fine particles | P-1 | 18 | 7 | — | — | — | — | — | — | — | 7 |
| Water | Ion-exchanged water | 46 | 54 | 56 | 51 | 46 | 41 | 31 | 54 | 55.2 | 49 |

Unit: Mass parts

FS-300 in Table 1 is as follows.
FS-300 (manufactured by Du Pont (effective component 40 mass %; fluorine-based surfactant)

Preparation of Treatment Liquid

Treatment Liquid 1

A treatment liquid 1 was prepared by mixing the components of the composition below.

| Composition of Treatment Liquid 1 | |
|---|---|
| Malonic acid (manufactured by Wako Pure Chemical Industries, Ltd.) | 25 mass % |
| Diethylene glycol monomethyl ether (manufactured by Wako Pure Chemical Industries, Ltd.) | 20 mass % |
| Emulgen P109 (manufactured by Kao Corporation; nonionic surfactant) | 1 mass % |
| Ion-exchanged water | 54 mass % |

Treatment Liquid 2

A treatment liquid 2 was prepared by mixing the components of the composition below.

| Composition of Treatment Liquid 2 | |
|---|---|
| Malonic acid (manufactured by Wako Pure Chemical Industries, Ltd.) | 25 mass % |
| Diethylene glycol monomethyl ether (manufactured by Wako Pure Chemical Industries, Ltd.) | 20 mass % |
| Emulgen P109 (manufactured by Kao Corporation; nonionic surfactant) | 1 mass % |
| Irgacure 2959 (manufactured by Nihon Chiba-Geigy K. K.; photoinitiator) | 1 mass % |
| Ion-exchanged water | 53 mass % |

Treatment Liquid 3

A treatment liquid 3 was prepared by mixing the components of the composition below.

| Composition of Treatment Liquid 3 | |
|---|---|
| Magnesium nitrate hexahydrate (polyvalent metal salt) | 25 mass % |
| Benzoin isobutyl ether | 10 mass % |
| Triethylene glycol monomethyl ether | 10 mass % |
| Glycerin | 10 mass % |
| Ion-exchanged water | residual so that total is 100 mass % |

Treatment Liquid 4

Preparation of Cationic Polymer Aqueous Solution

After guanidine acetate (65 g) and 1,6-hexamethylene diamine (66.7 g) was inserted into a 250 ml round-bottomed flask and mixed thereof, the mixture was heated to 120° C. while being stirred in an atmosphere of nitrogen gas and the stirring was continued for 4 hours. Next, the temperature was raised to 150° C. and the reactant mixture was stirred for a further 20 hours at this temperature. The reactant mixture was naturally cooled to room temperature, and next, the same volume of distilled water was mixed in and heated to 80° C., and this temperature was maintained until there is a uniform solution. The solution was cooled, the pH was adjusted to 7 by using acetic acid, the solution is diluted by mixing in ion-exchanged water so that the solid content is 25 mass %, and thus, the cationic polymer aqueous solution was obtained.

The obtained cationic polymer aqueous solution had an average molecular weight (Mw) of 1120 when measured using gel permeation chromatography.

The treatment liquid 4 was prepared by using the cationic polymer aqueous solution described above and mixing the components of the composition below.

| Composition of Treatment Liquid 4 | |
|---|---|
| Cationic polymer aqueous solution described above (solid content of 25 mass %) | 20 mass % |
| 2-pyrrolidone | 9 mass % |
| Thiodiethylene glycol | 9 mass % |
| Cyclohexanol | 2 mass % |
| Ion-exchanged water | residual so that total is 100 mass % |

Preparation of Recording Medium

The recording medium below was prepared for image forming.

TABLE 2

| Type of Paper | Grade | Manufacturer | Basis Weight (g/m$^2$) | Water Transference Amount | |
|---|---|---|---|---|---|
| | | | | 100 ms | 400 ms |
| OK Top Coat + | A2 Gloss | Oji Paper Co., Ltd. | 104.7 | 3.0 | 3.4 |
| Aurora Coat | A2 Gloss | Nippon Paper Industries Co., Ltd | 104.7 | 2.8 | 3.4 |
| New Edge | A2 Mat | Oji Paper Co., Ltd. | 104.7 | 5.9 | 8.9 |
| U-Lite | A2 Mat | Nippon Paper Industries Co., Ltd | 104.7 | 3.9 | 5.9 |
| Tokubishi Art both surfaces N | A1 Art | Mitsubishi Paper Mills Limited | 104.7 | 2.7 | 3.5 |
| OK Kanefuji + | A1 Art | Oji Paper Co., Ltd. | 127 | 1.9 | 2.5 |
| SA Kanefuji + | A0 Art | Oji Paper Co., Ltd. | 127 | 1.9 | 2.2 |
| Mirror Coating Platinum | Cast Coating Paper | Oji Paper Co., Ltd. | 104.7 | 0.2 | 0.3 |

Image Recording

First, as shown in FIG. 1, the ink jet apparatus was prepared by being provided with the treatment liquid imparting section 12 which is provided with the treatment liquid discharging head 12S which discharges the treatment liquid, the treatment liquid drying zone 13 which dries the treatment liquid which has been imparted, the ink discharging section 14 which discharges each type of the ink composition, the ink drying zone 15 which dries the ink composition which has been discharged, and the ultraviolet ray irradiation section 16 which is provided with the ultraviolet ray irradiation lamp 16S which is able to irradiate ultraviolet (UV) rays, sequentially toward the transport direction of the recording medium (in the direction of the arrow in the diagram).

Although not shown, the treatment liquid drying zone 13 was configured to be provided with a wind blowing unit which performs drying by blowing a drying wind to the recording surface side of the recording medium, to be provided with an infrared heater on the non-recording surface of the recording medium, and to be able to evaporate (dry) 70 mass % or more of the water in the treatment liquid by adjusting the temperature and the amount of wind until 900 msec has passed since the imparting of the treatment liquid has been started by the treatment imparting section. In addition, the ink discharging section 14 was a full line head (driving frequency: 25 kHz, transport speed of recording medium: 500 mm/s) where the black ink discharging head 30K, the cyan ink discharging head 30C, the magenta ink discharging head 30M, and the yellow ink discharging head 30Y are sequentially arranged in the transport direction (direction of the arrow) and where each head has a width of 1200 dpi/10 inches and is able to record by discharging each color with a single pass in the main scanning direction.

The treatment liquids 1 to 4 obtained as above and the cyan inks C1 to C10 were sequentially filled into respective retaining tanks (not shown) which are respectively linked to the treatment liquid discharging head 12S and the cyan ink discharging head 30C in the ink jet apparatus which is configured as shown in FIG. 1 and a solid image and a line image with 1200 dpi were recorded on the recording medium.

The imparting amount of the treatment liquid to the recording medium was 1.5 ml/m$^2$. Here, the 8 types of recording medium described in Table 2 were used by being sequentially changed.

When recording the image, the cyan ink was filled into two recording heads and was discharged from each of the heads with a resolution of 1200 dpi×1200 dpi, an ink droplet amount of 2.5 to 3.6 pl, and a maximum ink imparting amount of 11 ml/m$^2$ or 16 ml/m$^2$. The solid image was a solid image by ink being discharged over the entire surface of a sample where the recording medium has been cut into A5 size.

Specifically, the forming of the image was performed with the condition shown in table 3 below.

First, after the treatment liquid was discharged onto the recording medium as a single pass from the treatment liquid discharging head 12S, the drying of the treatment liquid was performed using the treatment liquid drying zone 13 and the treatment liquid drying zone is passed through approximately 900 msec from the start of the discharging of the treatment liquid. In the treatment liquid drying zone 13, the treatment liquid which has been attached as droplets is dried by a 120° C. warm wind being blown against the droplet attachment surface at 5 m/sec for 5 seconds using a wind blower while the film surface temperature is heated to be 40 to 45° C. using the infrared heater from the rear side (rear surface) of the droplet attachment surface. Subsequently, after the image was recorded by the cyan ink being discharged with a single pass using the discharge heads 30C and 30M which have been filled with cyan ink, drying is carried out so that the 120° C. warm wind using the wind blower is changed to wind amounts so that there is the predetermined drying amounts shown in Table 3 while the rear side (rear surface) of the ink droplet attachment surface is heated using the infrared heater in the same manner as described above in the ink drying zone 15. At this time, the transport speed was adjusted so that the time, which is from the point in time when the liquid droplets of cyan ink have landed on the recording medium to when the recording medium is transported to the ink drying zone 15 and the drying starts, is the desired time. Here, the measuring method of the drying amount will be described later. After the drying of the image, the image is cured by UV light (metal halide lamp manufactured by Eye Graphics Co. Ltd. with a maximum irradiation wavelength of 365 nm) being irradiated in the UV irradiation section 16 so that the accumulative radiation amount is 2 J/cm$^2$.

Measurement of Drying Amount

In the image forming described above, after the treatment liquid has been imparted (imparting amount of 5 ml/m$^2$), solid images with maximum ink imparting amounts of 11 ml/m$^2$ or 16 ml/m$^2$ as shown in Table 3 are each output. Here, the images are output without performing the heating and the wind blowing in the ink drying zone 15 and the irradiation of UV light in the UV irradiation section 16. With regard to the obtained image, the water content $W_0$ which is included in the image was measured by a Karl Fischer method using a Karl Fischer moisture meter MKA-520 (manufactured by Kyoto Electronic Manufacturing Co. Ltd.).

Furthermore, with regard to the image which was obtained without performing the irradiation with UV light in the same manner other than the predetermined drying conditions of the heating and wind blowing in the ink drying zone 15, the water content $W_1$ which is included in the image was measured by a Karl Fischer method in the same manner and the drying amount (%) was calculated in the equation (1).

$$\{(W_0 - W_1)/W_0\} \times 100 \qquad \text{Equation (1)}$$

TABLE 3

| Recording Medium No | Treatment Liquid | Ink | Maximum Imparting Amount (ml/m$^2$) | Time until Drying*[1] (secs) | Drying Amount (%) | Reference |
|---|---|---|---|---|---|---|
| 1 OK Top Coat + | Treatment Liquid 1 | C4 | 11 | 1 | 68 | Present Invention |
| 2 Aurora Coat | Treatment Liquid 1 | C4 | 11 | 1 | 72 | Present Invention |
| 3 New Edge | Treatment Liquid 1 | C4 | 11 | 1 | 81 | Present Invention |
| 4 U-Lite | Treatment Liquid 1 | C4 | 11 | 1 | 75 | Present Invention |
| 5 Tokubishi Art both surfaces N | Treatment Liquid 1 | C4 | 11 | 1 | 63 | Present Invention |
| 6 OK Kanefuji + | Treatment Liquid 1 | C4 | 11 | 1 | 62 | Present Invention |
| 7 SA Kanefuji + | Treatment Liquid 1 | C4 | 11 | 1 | 60 | Present Invention |
| 8 Tokubishi Art both surfaces N | Treatment Liquid 1 | C2 | 11 | 1 | 68 | Present Invention |
| 9 Tokubishi Art both surfaces N | Treatment Liquid 1 | C3 | 11 | 1 | 67 | Present Invention |
| 10 Tokubishi Art both surfaces N | Treatment Liquid 1 | C5 | 11 | 1 | 65 | Present Invention |
| 11 Tokubishi Art both surfaces N | Treatment Liquid 1 | C6 | 11 | 1 | 64 | Present Invention |
| 12 Tokubishi Art both surfaces N | Treatment Liquid 2 | C8 | 11 | 1 | 64 | Present Invention |
| 13 Tokubishi Art both surfaces N | Treatment Liquid 3 | C4 | 11 | 1 | 56 | Present Invention |

TABLE 3-continued

| Recording Medium No | Treatment Liquid | Ink | Maximum Imparting Amount (ml/m$^2$) | Time until Drying*1 (secs) | Drying Amount (%) | Reference |
|---|---|---|---|---|---|---|
| 14 Tokubishi Art both surfaces N | Treatment Liquid 4 | C4 | 11 | 1 | 52 | Present Invention |
| 15 Tokubishi Art both surfaces N | Treatment Liquid 1 | C4 | 11 | 3 | 63 | Present Invention |
| 16 Tokubishi Art both surfaces N | Treatment Liquid 1 | C4 | 11 | 5 | 67 | Present Invention |
| 17 Tokubishi Art both surfaces N | Treatment Liquid 1 | C4 | 11 | 10 | 64 | Present Invention |
| 18 Tokubishi Art both surfaces N | Treatment Liquid 1 | C4 | 16 | 1 | 60 | Present Invention |
| 19 Tokubishi Art both surfaces N | Treatment Liquid 1 | C1 | 11 | 1 | 63 | Comparison |
| 20 Tokubishi Art both surfaces N | Treatment Liquid 1 | C7 | 11 | 1 | 61 | Comparison |
| 21 Mirror Coating Platinum | Treatment Liquid 1 | C2 | 11 | 1 | 61 | Comparison |
| 22 OK Top Coat + | — | C9 | 11 | 1 | 71 | Comparison |
| 23 Aurora Coat | — | C9 | 11 | 1 | 70 | Comparison |
| 24 New Edge | — | C9 | 11 | 1 | 78 | Comparison |
| 25 U Light | — | C9 | 11 | 1 | 74 | Comparison |
| 26 Tokubishi Art both surfaces N | — | C9 | 11 | 1 | 66 | Comparison |
| 27 OK Kanefuji + | — | C9 | 11 | 1 | 67 | Comparison |
| 28 SA Kanefuji + | — | C9 | 11 | 1 | 63 | Comparison |
| 29 Tokubishi Art both surfaces N | Treatment Liquid 1 | C10 | 11 | 1 | 65 | Comparison |
| 30 Tokubishi Art both surfaces N | Treatment Liquid 1 | C4 | 11 | 1 | Not dried | Comparison |

*1Time from lading of ink to point in time of entering drying zone 15

Evaluation

With regard to the images which were obtained using the image forming described above, the following evaluation was performed. The evaluation results are shown in Table 4 below.

1. Adhesion

After an A5 size sample where a solid image was formed over the whole surface was left at 25° C. in an environment with 50% RH for 10 minutes, cellophane tape (manufactured by Nichiban Co. Ltd.) was adhered to the image and peeled off and the state of damage to the image was evaluated according to the following evaluation criteria.

Evaluation Criteria

A: The image was not transferred to the tape.
B: A portion of the image was transferred to the tape but most of the image was not transferred and remained.
C: A portion of the image was transferred and a portion of the surface of the recording medium where there is no image was exposed.
D: The image was transferred over the entire surface thereof and the surface of the recording medium was exposed.

Resistance to Excessive Abrasion

A5 size samples where a 100% solid halftone dot image or a 20% solid halftone dot image are formed over the whole surface thereof are respectively left at 25° C. in an environment with 50% RH for 1 hour and the surface of the solid image of the each sample after being left is rubbed back and forth 10 times with a load of 200 kg/m$^2$ with a recording medium where there has been no recording. After this, the image is visually observed and evaluated according to the following evaluation criteria.

Evaluation Criteria

A: Deterioration of the solid images which were rubbed was not recognized in any of the samples.
B: Deterioration of the solid images which were rubbed was recognized one of the samples.
C: Deterioration of the solid images which were rubbed was recognized in both of the samples.
D: The solid image fell off and the paper surface was exposed in one or both of the samples.

3. Scratch Resistance

An A5 size sample where a 100% solid halftone dot image is formed over the whole surface thereof is left at 25° C. in an environment with 50% RH for 1 hour and the surface of the solid image of the sample after being left is scratched while the load is changed from 0 to 200 gf using a 0.1 mm stainless steel scratching needle using a HEIDON surface testing unit (manufactured by Shinto Scientific Co. Ltd.). After this, the load where a scratch occurs in the image surface was evaluated according to the following evaluation criteria.

Evaluation Criteria

A: No scratches are recognized even at 200 gf.
B: Scratches occur at 100 gf or more and less than 200 gf.
C: Scratches occur at 30 gf or more and less than 100 gf.
D: Scratches occur at less than 30 gf.

4. Curing

The recording medium after a 100% solid image was formed is cut into 5×50 mm sizes to form sample fragments so that the curling direction is in the direction of the 50 mm length. The sample fragments were left for 10 minutes in conditions of a temperature of 35° C. and relative humidity of 80%, the curvature C of the samples were measured using the following method, and the curling was evaluated according to the following evaluation criteria.

Curvature Measuring Method

The curvature C of the samples were measured in the same conditions after the sample fragments had been left for 10 minutes in conditions of a temperature of 25° C. and relative humidity of 50%. The curvature C is expressed by equation (2) below by the curl which occurs being seen as an arc with a radius R and the curvature C is set as the indicator for the evaluation of the curling.

$C=1/R$ (m).  (equation 2)

Evaluation Criteria
A: The curvature C was less than 10.
B: The curvature C was 10 or more and less than 15.
C: The curvature C was 15 or more and less than 20.
D: The curvature C was 20 or more.

5. Glossiness

After a recording medium where images where the halftone dot are changed from 10 to 100% with 10% intervals were formed was left for 1 hour in a condition of a temperature of 25° C. and relative humidity of 50%, the 60° glossiness of the image surface was measured with regard to each of the halftone dot images using a gloss checker IG-331 (manufactured by Horiba, Ltd.). The difference (difference in glossiness) between the maximum value (Gmax) and the minimum value (Gmin) was calculated and evaluated according to the following evaluation criteria.

Difference in Glossiness=$G$max−$G$min

Evaluation Criteria
A: The difference in glossiness was less than 10.
B: The difference in glossiness was 10 or more and less than 20.
C: The difference in glossiness was 20 or more and less than 30.
D: The difference in glossiness was 30 or more.

TABLE 4

| No | Adhesion | Resistance to Excessive Abrasion | Scratch Resistance | Curling | Glossiness | Reference |
|---|---|---|---|---|---|---|
| 1 | A | A | A | A | A | Present Invention |
| 2 | A | A | A | A | A | Present Invention |
| 3 | A | A | A | A | A | Present Invention |
| 4 | A | A | A | A | B | Present Invention |
| 5 | A | A | A | A | A | Present Invention |
| 6 | A | A | A | A | A | Present Invention |
| 7 | A | A | A | A | A | Present Invention |
| 8 | A | B | A | A | A | Present Invention |
| 9 | A | A | A | A | A | Present Invention |
| 10 | A | A | A | A | A | Present Invention |
| 11 | A | A | B | A | B | Present Invention |
| 12 | B | A | B | A | A | Present Invention |
| 13 | B | A | B | A | A | Present Invention |
| 14 | B | A | B | A | A | Present Invention |
| 15 | A | A | A | A | A | Present Invention |
| 16 | A | A | B | B | A | Present Invention |
| 17 | B | B | B | B | A | Present Invention |
| 18 | A | B | B | B | B | Present Invention |
| 19 | C | B | C | B | B | Comparison |
| 20 | B | B | C | A | D | Comparison |
| 21 | D | C | C | A | A | Comparison |
| 22 | D | D | D | D | B | Comparison |
| 23 | D | D | D | D | B | Comparison |
| 24 | D | D | D | D | B | Comparison |
| 25 | D | D | D | D | B | Comparison |
| 26 | D | D | D | D | B | Comparison |
| 27 | D | D | D | D | B | Comparison |
| 28 | D | D | D | D | B | Comparison |
| 29 | D | C | D | C | B | Comparison |
| 30 | D | C | D | D | B | Comparison |

As shown in Table 4, in the present invention, it is possible to form images with superior adhesion to the recording medium and scratch resistance without curling (deforming) of the image or deterioration in the glossiness.

On the other hand, in the comparative examples which were performed as a comparison to the present invention, in the example (No. 21) which uses a mirror coating platinum where the transference amount of pure water is small as the recording medium, the glossiness and the curling of the image did not deteriorate but the permeation amount of the polymerizable monomer into the coating layer was small, and since the improvement effect due to the polymerization curing was small, the image which was formed was inferior in terms of adhesion to the recording medium and scratch resistance. In addition, in the examples (No. 22 to 28) where image were formed without the imparting of the treatment liquid using cyan ink where the polymerizable compound was not included, the permeation amount of the water and the water soluble organic solvent into the coating layer was large and the coating layer was unable to be maintained in this form, and along with this, it was not possible to maintain excellent adhesion or scratch resistance with regard to the image. In addition, deterioration in terms of curling was remarkable due to the water and the water soluble organic solvent permeating to the original paper layer through the coating layer. In addition, in the example (No. 29) where the cyan ink C10, where the content of the water soluble organic solvent exceeded 3 mass %, was used as the ink, the adhesion and the scratch resistance of the image which was formed was lower compared to the cases where the cyan inks C1 to C8 were used since the water soluble organic solvent which permeated into the coating layer was high. On the other hand, in the example (No. 30), where the UV irradiation was performed immediately after the ink discharging without the drying step being provided, the water content which remained in the coating layer was high, therefore, the deterioration of the coating layer progressed, and the polymerization curing did not progress due to insufficient drying, as a result, the adhesion and the scratch resistance of the image which was formed was lower compared to the cases where the cyan inks C1 to C8 were used.

This application claims priority under 35 U.S.C. §119 of Japanese Patent application JP 2011-183167, filed on Aug. 24, 2011, the entire contents of which are hereby incorporated by reference.

What is claimed is:
1. An image forming method comprising:
imparting ink to form an image by an ink composition being imparted on a recording medium using an ink jet method;

drying the image which is formed on the recording medium; and curing the image by the image after the drying being irradiated with an active energy ray, wherein the recording medium has one or a plurality of pigment layers on at least one surface of a support with cellulose pulp as a main component, a transference amount of pure water into the recording medium which is measured by a dynamic scanning absorptometer is equal to or more than 1 ml/m$^2$ and equal to or less than 15 ml/m$^2$ at a contact time of 100 ms and is equal to or more than 2 ml/m$^2$ and equal to or less than 20 ml/m$^2$ at a contact time of 400 ms, the ink composition includes a pigment, water, and a water soluble polymerizable compound where the content ratio of the polymerizable compound with regard to total mass of the composition is equal to or more than 15 mass % and less than 40 mass %, and the content of a water soluble organic solvent with regard to the total mass of the composition is less than 3 mass %, the polymerizable compound includes a monofunctional acrylamide represented by a general formula (1) where n=1 and a multi-functional acrylamide represented by the general formula (1) where n is two or more, and the content of the monofunctional acrylamide with regard to total mass of the composition is equal to or more than 10 mass %,

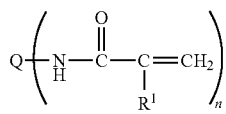

General Formula (1)

wherein in the general formula (1), Q represents a n-valent group and R$^1$ represents a hydrogen atom or a methyl group, and n represents an integer of 1 or more.

2. The image forming method according to claim 1, wherein at least one polymerizable compound is a monomer compound which has an acrylamide structure in the molecule.

3. The image forming method according to claim 1, wherein the at least one polymerizable compound is a monofunctional acrylamide which has an acrylamide structure in the molecule.

4. The image forming method according to claim 1, wherein the at least one polymerizable compound is a monofunctional acrylamide which has an acrylamide structure in the molecule and the content of the monofunctional acrylamide is equal to or more than 10 mass % with regard to the total mass of ink composition.

5. The image forming method according to claim 1, further comprising:

imparting a treatment liquid on a recording medium before the imparting of the ink, wherein the treatment liquid includes an aggregation component capable of forming an aggregate body when in contact with the ink composition.

6. The image forming method according to claim 1, further comprising:

imparting a treatment liquid on a recording medium before the imparting of the ink, wherein the treatment liquid includes an aggregation component capable of forming an aggregate body when in contact with the ink composition, and the aggregation component includes at least one selected from an acid, a polyvalent metal salt and a cationic polymer.

7. The image forming method according to claim 1, wherein the pigment is a water dispersible pigment where at least a portion of a surface thereof is coated with a polymeric dispersing agent.

8. The image forming method according to claim 1, wherein the pigment is a water dispersible pigment where at least a portion of a surface thereof is coated with a polymeric dispersing agent which has a carboxyl group.

9. The image forming method according to claim 1, wherein the recording medium is coated paper, lightweight coated paper, or lightly coated paper.

10. The image forming method according to claim 1, further comprising:

imparting a treatment liquid on a recording medium before the imparting of the ink, wherein the treatment liquid includes an aggregation component capable of forming an aggregate body when in contact with the ink composition, and at least one of the ink composition and the treatment liquid further includes a polymerization initiator.

11. The image forming method according to claim 1, wherein drying starts within 5 seconds from a point in time when droplets of the ink composition land on the recording medium.

12. The image forming method according to claim 1, wherein an imparted amount of the ink composition in the imparting of the ink is equal to or less than 15 ml/m$^2$.

13. The image forming method according to claim 1, wherein the drying removes at least a portion of water within the ink composition which forms the image on the recording medium under drying conditions where 60 to 80 mass % of the water content within the ink composition which is imparted on the recording medium with an imparted amount of equal to or less than 15 ml/m$^2$ is removed.

* * * * *